United States Patent
Togashi et al.

(10) Patent No.: US 6,914,767 B2
(45) Date of Patent: Jul. 5, 2005

(54) MULTILAYER CAPACITOR

(75) Inventors: Masaaki Togashi, Tokyo (JP); Ichirou Imai, Akita-ken (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/798,361

(22) Filed: Mar. 12, 2004

(65) Prior Publication Data

US 2004/0179325 A1 Sep. 16, 2004

(30) Foreign Application Priority Data

Mar. 12, 2003 (JP) ........................................ 2003-066374
Mar. 31, 2003 (JP) ........................................ 2003-094148
Apr. 10, 2003 (JP) ........................................ 2003-106145

(51) Int. Cl.[7] ........................ H01G 4/005; H01G 4/06; H01G 4/228
(52) U.S. Cl. ...................... 361/303; 361/311; 361/306.3
(58) Field of Search ................................ 361/303–305, 361/301.4, 306.3, 311–313, 321.1, 321.2, 321.3, 321.4, 321.5

(56) References Cited

U.S. PATENT DOCUMENTS 6,441,459 B1 * 8/2002 Togashi et al. ............. 257/532

2001/0055191 A1 * 12/2001 Naito et al. ................. 361/303
2003/0026059 A1 * 2/2003 Togashi ...................... 361/303

FOREIGN PATENT DOCUMENTS

| JP | A 11-144996 | 5/1999 |
| JP | A 2001-284171 | 10/2001 |
| JP | A 2002-151349 | 5/2002 |
| JP | A 2002-164256 | 6/2002 |
| JP | A 2002-231559 | 8/2002 |

* cited by examiner

*Primary Examiner*—Eric W. Thomas
(74) *Attorney, Agent, or Firm*—Oliff & Berridge, PLC

(57) ABSTRACT

Internal dielectric layers isolated between them by a ceramic layer are arranged in a dielectric body, other internal conductor layers also isolated between them by a ceramic layer are arranged in the dielectric body by being isolated from the above internal conductor layers. Each of the all internal conductor layers is formed with a cut part, and a channel part is formed around the cut part, and the channel parts are arranged so that currents flow in mutually reverse directions between channel parts of internal conductor layers adjoining across a ceramic layer. Consequently, the equivalent serial inductance of the multilayer capacitor is largely reduced and fluctuations of a power source voltage of a CPU is made small.

5 Claims, 21 Drawing Sheets

CURRENT FLOW

I : DRIVE CURRENT OF CPU
Ic : DISCHARGE CURRENT FROM CAPACITOR
Iv : CURRENT FROM POWER SOURCE
C : ELECTROSTATIC CAPACITY
ESR : EQUIVALENT SERIAL RESISTANCE
ESL : EQUIVALENT SERIAL INDUCTANCE

MULTILAYER CAPACITOR

BACKGROUND OF THE INVENTION

1. Field of the Invention

The present invention relates to a multilayer capacitor wherein the equivalent serial inductance (ESL) is greatly reduced, more particularly relates to a multilayer ceramic capacitor capable of reducing the voltage fluctuations of a CPU power source.

2. Description of the Related Art

In recent years, CPUs (central processing units) used for data processing apparatuses have become higher in operating frequency and remarkably increased in current consumption due to the improvement in processing speeds and higher integration. Along with this, there is a trend toward reduction of the power consumption so as to reduce the operating voltage. Therefore, in power sources for supplying power to CPUs, faster and larger current fluctuations occur. It has become extremely difficult to keep voltage fluctuations accompanying current fluctuations to within tolerances of the power sources.

Therefore, as shown in FIG. 7, a multilayer capacitor 100 called a "decoupling capacitor" is connected to a power source 102 and frequently used for stabilization of the power source. Further, by fast charging and discharging at the time of high speed, transient fluctuations in current, the multilayer capacitor 100 supplies current to the CPU 104 and suppresses voltage fluctuations in the power source 102.

Along with the increasingly higher operating frequencies of today's CPUs, however, the current fluctuations have become faster and larger. Therefore, the equivalent serial inductance (ESL) of the multilayer capacitor 100 itself shown in FIG. 7 becomes relatively larger. As a result, the equivalent serial inductance greatly influences voltage fluctuations of the power source.

That is, in a conventional multilayer capacitor 100 used for the power source circuit of the CPU 104 shown in FIG. 7, the ESL of the parasitic part shown in the equivalent circuit of FIG. 7 is high. Thus, along with fluctuations of the current I as shown in FIG. 8, the ESL inhibits the charging and discharging of the multilayer capacitor 100. Therefore, in the same way as the above, the fluctuations in the voltage V of the power source easily become greater as shown in FIG. 8, so that it will become impossible to handle the increasingly higher speeds of CPUs in the future.

This is because the voltage fluctuations at the time of charging and discharging as transition of the current are approximated by the following equation 1 and therefore the level of the ESL is related to the magnitude of fluctuation of the power source voltage:

$$dV = ESL \cdot di/dt \qquad \text{formula (1)}$$

Here, dV is transitory fluctuation of voltage (V), "i" is the amount of current fluctuation (A), and "t" is the time of fluctuation (sec).

Here, the appearance of this conventional capacitor is shown in FIG. 9 and the internal structure is shown in FIG. 10. Below, a conventional multilayer capacitor 100 will be explained based on these figures. That is, the conventional multilayer capacitor 100 shown in FIG. 9 is structured to give an electrostatic capacity by alternately stacking a pair of ceramic layers 112A each provided with one of two types of internal conductor layers 114 and 116 shown in FIG. 10 and forming a dielectric body 112.

Further, these two types of internal conductor layers 114 and 116 are led out to mutually facing two side surfaces 112B and 112C. Further, the terminal electrode 118 connected to the internal conductor layers 114 and the terminal electrode 120 connected to the internal conductor layer 116 are set at the mutually facing side surfaces 112B and 112C of the multilayer capacitor 100 shown in FIG. 9.

In the conventional multilayer capacitor 100, the ESL is large and it has been particularly difficult to reduce the voltage fluctuations of CPU power sources.

Note that to reduce the ESL, multilayer capacitors disclosed in the Japanese Unexamined Patent Publication No. 11-144996, No. 2001-284171, No. 2002-151349, No. 2002-231559 and No. 2002-164256, etc. have been developed.

However, there have been demands for multilayer capacitors capable of furthermore reducing particularly the voltage fluctuations of CPU power sources.

SUMMARY OF THE INVENTION

The present invention has as its object the provision of a multilayer capacitor capable of greatly reducing the equivalent serial inductance and reducing the voltage fluctuations in CPU power sources.

To attain this object, the multilayer capacitor according to the present invention is a multilayer capacitor having dielectric layers and at least four types of, that is, first to fourth, internal conductor layers insulated from one another by the dielectric layer and arranged in an order from the first to fourth ones in a dielectric body;

wherein each of the first to fourth internal conductor layers is formed with at least one cut part;

the internal conductor layers are formed with channel parts for current to flow in return by the respective cut parts; and the channel parts in the internal conductor layers adjoining each other across the dielectric layer in the stacking direction carry current flowing in the reverse directions from each other.

According to the multilayer capacitor of the first aspect of the present invention, when powering up the multilayer capacitor, currents flow in mutually reverse directions between adjoining channel parts above and below across a dielectric layer in the stacking direction. Along with this, magnetic fluxes generated by a high frequency current flowing in the internal conductor layers are cancelled out by each other and the parasitic inductance of the multilayer capacitor itself is reduced. Therefore, the equivalent serial inductance (ESL) is reduced. Furthermore, even in the same internal conductor layer, channel parts positioned on both sides of a curt part carry mutually reverse currents, so that the ESL is furthermore reduced from this point.

As explained above, in the multilayer capacitor according to the first aspect of the present invention, the ESL is further reduced and the effective inductance is greatly reduced. As a result, according to the first aspect of the present invention, fluctuation of a power source voltage can be surely suppressed and an optimal multilayer capacitance for a CPU power source is obtained.

Preferably, plane shapes of the first internal conductor layer and the third internal conductor layer are symmetric each other with respect to the center of them.

Preferably, plane shapes of the second internal conductor layer and the fourth internal conductor layer are symmetric each other with respect to the center of them.

By forming the internal conductor layers to have the above pattern, currents are easily made to be in mutually reverse directions between channel parts of internal conductor layers adjoining across a dielectric layer in the stacking direction.

Preferably, the first internal conductor layer has a first lead part led to a first side surface of the dielectric body; and the third internal conductor layer has a third lead part led to a third side surface being opposite of the first side surface of the dielectric body.

Preferably, the first side surface of the dielectric body is attached with a first terminal electrode connected to the first lead part; and the third side surface of the dielectric body is attached with a third terminal electrode connected to the third lead part.

Preferably, the second internal conductor layer has a second lead part led to a second side surface being different from the first side surface and the third side surface of the dielectric body; and the fourth internal conductor layer has a fourth lead part led to a fourth side surface on the opposite side of the second side surface of the dielectric body.

Preferably, the second side surface of the dielectric body is attached with a second terminal electrode connected to the second lead part; and the fourth side surface of the dielectric body is attached with a fourth terminal electrode connected to the fourth lead part.

By forming terminal electrodes respectively on the four side surfaces of the dielectric body as above, the ESL can be reduced.

Preferably, a width of the first lead part is substantially the same with the entire width of the first internal conductor layer formed with the cut part; and a width of the third lead part is substantially the same with the entire width of the third internal conductor layer formed with the cut part.

Preferably, the first terminal electrode and the third terminal electrode have the same or wider width compared with those of the first lead part and third lead part.

By making the widths of the first lead part and third lead part wide as above, connection of the lead parts and corresponding terminal electrodes are furthermore ensured.

A width of the second lead part may be substantially the same as that of the channel part separated by the cut part of the second internal conductor layer; and a width of the fourth lead part may be substantially the same as that of the channel part separated by the cut part of the fourth internal conductor layer.

Note that the widths of the second and fourth lead parts may be substantially the same as the width of the corresponding internal conductor layer.

Preferably, the second lead part is led to the substantial center portion of the second side surface; and the fourth lead part is led to the substantial center of the fourth side surface.

In the first aspect of the present invention, a width of the second terminal electrode may be substantially the same as or wider than that of the second lead part but narrower than that of the second side surface; and a width of the fourth terminal electrode may be substantially the same as that of the second terminal electrode.

In the first aspect of the present invention, the first to fourth internal conductor layers may be stacked in this order repeatedly for a plurality of times in the stacking direction respectively across the dielectric layers. In this case, an electrostatic capacity of the multilayer capacitor becomes large, the effect of cancellation of the magnetic field is improved, the inductance is greatly reduced, and the ESL is furthermore reduced.

According to the first aspect of the present invention, a shape of a plane of the cut part is not particularly limited but preferably is, for example, a substantial L-shape. When in the case of the L-shaped cut part, channel parts in mutually reverse directions are easily formed.

To attain the above object, a multilayer capacitor according to the second aspect of the present invention is a multilayer capacitor comprising:

dielectric layers and at least eight types of, that is, first to eight, internal conductor layers insulated from one another by the dielectric layer and arranged in an order from the first to eighth ones in a dielectric body;

wherein each of the first to eighth internal conductor layers is formed with at least one cut part;

each of the internal conductor layers is formed with a channel part for a current to flow in return by the cut part; and the channel parts in the internal conductor layers adjoining each other across the dielectric layer in the stacking direction carry current flowing in the reverse directions from each other.

In the second aspect of the present invention, eight types of internal conductor layers respectively have cut parts, portions around the cut parts on the internal conductor layers configure channel parts, and currents flow in reverse directions on the same plane and flow in mutually reverse directions between channel parts of other internal conductor layers adjoining across a dielectric layer.

Accordingly, magnetic fluxes generated by a high frequency current flowing in the internal conductor layers are cancelled out by each other, and the parasitic inductance of the multilayer capacitor itself can be reduced. As a result, the equivalent serial inductance (ESL) is decreased.

Furthermore, even in the same internal conductor layer, currents flow in mutually reverse directions between channel portions positioned on both sides of a cut part, so that the equivalent serial inductance is furthermore reduced.

From the above, according to the multilayer capacitor of the second aspect of the present invention, furthermore reduced ESL can be attained and the effective inductance is furthermore greatly reduced.

Preferably, plane shapes of the first internal conductor layer and the fifth internal conductor layer are symmetric with respect to the center of them;

plane shapes of the second internal conductor layer and the sixth internal conductor layer are symmetric with respect to the center of them;

plane shapes of the third internal conductor layer and the seventh internal conductor layer are symmetric with respect to the center of them; and plane shapes of the fourth internal conductor layer and the eighth internal conductor layer are symmetric with respect to the center of them.

By configuring the first to eighth internal conductor layers to have the above pattern, currents in reverse directions are easily made between adjoining internal conductor layers in the stacking direction.

Preferably, the first internal conductor layer has a first lead part led to the first side surface of the dielectric body;

the second internal conductor layer has a second lead part led to a different position from the first lead part on the first side surface of the dielectric body;

the fifth internal conductor layer has a fifth lead part led to the third side surface on the opposite side of the first side surface of the dielectric body;

the sixth internal conductor layer has a sixth lead part led to a different position from the fifth lead part on the third side surface of the dielectric body;

the third internal conductor layer has a third lead part led to the second side surface being different from the first side surface and the third side surface of the dielectric body;

the fourth internal conductor layer has a fourth lead part led to a different position from the third lead part on the second side surface of the dielectric body;

the seventh internal conductor layer has a seventh lead part led to the fourth side surface on the opposite side of the second side surface of the dielectric body; and the eighth internal conductor layer has a eighth lead part led to a different position from the seventh lead part on the fourth side surface of the dielectric body.

Preferably, a first terminal electrode and a second terminal electrode respectively connected to the first lead part and second lead part are attached to the first side surface of the dielectric body;

a third terminal electrode and a fourth terminal electrode respectively connected to the third lead part and fourth lead part are attached to the second side surface of the dielectric body;

a fifth terminal electrode and a sixth terminal electrode respectively connected to the fifth lead part and sixth lead part are attached to the third side surface of the dielectric body; and a seventh terminal electrode and an eighth terminal electrode respectively connected to the seventh lead part and eighth lead part are attached to the fourth side surface of the dielectric body.

By arranging the lead parts and electrodes configured as above, two terminal electrodes can be formed on each of the four side surfaces of the dielectric body. Moreover, when powering up the multilayer capacitor, polarities of adjoining terminal electrodes become mutually different to be alternately positive and negative electrodes for currents to flow. As a result, magnetic fluxes generated at the respective lead parts are cancelled out by each other by the currents flowing in reverse directions in the lead parts, and the effect of furthermore reducing the equivalent serial inductance is obtained.

Preferably, a width of each of the lead parts is ⅓ to ¼ of a width of the channel part in each of the internal conductor layers. Due to the sizes, the configuration of arranging two terminal electrodes on one side surface can be surely attained. Also, the respective internal conductor layers and terminal electrodes are more surely connected.

Preferably, the first to eighth internal conductor layers are stacked in this order repeatedly for a plurality of times in the stacking direction respectively across the dielectric layers.

In this case, not only does the electrostatic capacity of the multilayer capacitor become higher, but also the action of cancellation of the magnetic fields becomes further greater, the inductance is more greatly reduced, and the ESL is more greatly reduced.

In the second aspect of the present invention, the plane shape of the cut part is not particularly limited, but preferably it is substantially a linear shape. In the second aspect of the present invention, currents flowing in mutually reverse directions are easily made even when the plane shape of the cut part is made to be substantial linear shape.

To attain the above object, the multilayer capacitor according to a third aspect of the present invention is a multilayer capacitor comprising:

dielectric layers, and at least four types of, that is, first to fourth, internal conductor layers insulated from one another by the dielectric layer and arranged in an order from the first to eighth ones in a dielectric body, a fifth internal conductor layer formed on the dielectric layer formed with the first internal conductor layer, adjacent to the first internal conductor layer on the same plane to be a pattern isolated from the first internal layer;

a sixth internal conductor layer formed on the dielectric layer formed with the second internal conductor layer, adjacent to the second internal conductor layer on the same plane to be a pattern isolated from the second internal layer;

a seventh internal conductor layer formed on the dielectric layer formed with the third internal conductor layer, adjacent to the third internal conductor layer on the same plane to be a pattern isolated from the third internal layer; and an eighth internal conductor layer formed on the dielectric layer formed with the fourth internal conductor layer, adjacent to the fourth internal conductor layer on the same plane to be a pattern isolated from the fourth internal layer;

wherein each of the first to eighth internal conductor layers is formed with at least one cut part;

each of the internal conductor layers is formed with a channel part for a current to flow in return by the cut part; and the channel parts in the internal conductor layers adjoining each other across the dielectric layer in the stacking direction carry current flowing in the reverse directions from each other.

In a multilayer capacitor according to the third aspect of the resent invention, when powering up the multilayer capacitor, currents flow in mutually reverse directions between adjoining channel parts above and below across a dielectric layer in the stacking direction. Along with this, magnetic fluxes generated by a high frequency current flowing in the internal conductor layers are cancelled out by each other and the parasitic inductance of the multilayer capacitor itself is reduced. Therefore, the equivalent serial inductance (ESL) is reduced. Furthermore, even in the same internal conductor layer, channel parts positioned on both sides of a curt part carry mutually reverse currents, so that the ESL is furthermore reduced from this point.

In the third aspect of the present invention, two out of eight types of internal conductor layers are respectively arranged on the same plane to be four layers to be stacked. Therefore, inside of one dielectric body, two sets of capacitors arranged with the internal conductor layers facing to each other and arranged in parallel are formed.

Namely, the multilayer capacitor according to the third aspect of the present invention exhibits the effect such that there are two adjoining multilayer capacitors according to the first aspect of the present invention in one dielectric body, and the ESL is furthermore reduced and the effective inductance is greatly reduced. As a result, according to the third aspect, fluctuations of a power source voltage can be surely suppressed and an optimal multilayer capacitor for a CPU power source can be obtained.

Also, in the third aspect of the present invention, eight types of internal conductor layers are arranged by two on the same plane to compose a capacitor array configured by two sets of capacitors, a multilayer capacitor with higher performance can be realized.

Preferably, plane shapes of the first internal conductor layer and the third internal conductor layer are symmetric with respect to the center of them;

plane shapes of the second internal conductor layer and the fourth internal conductor layer are symmetric with respect to the center of them;

plane shapes of the fifth internal conductor layer and the seventh internal conductor layer are symmetric with respect to the center of them; and plane shapes of the sixth internal conductor layer and the eighth internal conductor layer are symmetric with respect to the center of them.

More preferably, plane shapes of the first internal conductor layer and the fifth internal conductor layer are symmetric with respect to the center of a space between them;

plane shapes of the second internal conductor layer and the sixth internal conductor layer are symmetric with respect to the center of a space between them;

plane shapes of the third internal conductor layer and the seventh internal conductor layer are symmetric with respect to the center of a space between them; and plane shapes of the fourth internal conductor layer and the eighth internal conductor layer are symmetric with respect to the center of a space between them.

By forming the internal conductor layers to be the above pattern, currents are easily made to be in mutually reverse directions between channel parts of internal conductor layers adjoining across a dielectric layer in the stacking direction.

Preferably, the first internal conductor layer has a first lead part led to the first side surface of the dielectric body;

the fifth internal conductor layer has a fifth lead part led to the third side surface on the opposite side of the first side surface of the dielectric body;

the second internal conductor layer has a second lead part led to a different position from the first lead part on the first side surface of the dielectric body;

the sixth internal conductor layer has a sixth lead part led to a different position from the fifth lead part on the third side surface of the dielectric body;

the third internal conductor layer has a third lead part led to a different position from the fifth lead part and sixth lead part on the third side surface of the dielectric body;

the seventh internal conductor layer has a seventh lead part led to a different position from the first lead part and second lead part on the first side surface of the dielectric body;

the fourth internal conductor layer has a fourth lead part led to a different position from the third lead part, fifth lead part and sixth lead part on the third side surface of the dielectric body; and the eighth internal conductor layer has a eighth lead part led to a different position from the first lead part, second lead part and seventh lead part on the first side surface of the dielectric body.

Preferably, the first side surface of the dielectric body is attached with a first terminal electrode connected to the first lead part, a second terminal electrode connected to the second lead part, a seventh terminal electrode connected to the seventh lead part and an eighth terminal electrode connected to the eighth lead part; and the third side surface of the dielectric body is attached with a third terminal electrode connected to the third lead part, a fourth terminal electrode connected to the fourth lead part, a fifth terminal electrode connected to the fifth lead part and an sixth terminal electrode connected to the sixth lead part.

As a result, for example, lead parts of two internal conductor layers adjoining across a dielectric layer are respectively connected to two adjoining terminal electrodes arranged on a side surface of the dielectric body. Accordingly, when powering up the multilayer capacitor, polarities of adjoining terminal electrodes become mutually different to be alternately positive and negative electrodes for currents to flow. As a result, magnetic fluxes generated at the respective lead parts are cancelled out by each other by the currents flowing in reverse directions in the lead parts, and the effect of furthermore reducing the equivalent serial inductance is obtained.

Preferably, each of the widths of the first to eight lead parts is the same as or narrower than that of a channel part in the internal conductor layers. Due to the configuration, four terminal electrodes can be arranged next to each other on each of two facing side surfaces of the dielectric body.

Preferably, the dielectric body has a parallelepiped shape having the second side surface and fourth side surface being different from the first side surface and third side surface; and widths of the first side surface and third side surface are wider than those of the second side surface and fourth side surface.

Due to the above configuration, four of the total of eight lead parts respectively led from the eight internal conductor layers are easily led to each of longitudinally formed two side surfaces of the four side surfaces of the dielectric body. Furthermore, polarities of adjoining terminal electrodes become mutually different. Also, since each of the longitudinally formed two side surfaces of the four side surfaces of the dielectric element is provided with four terminal electrodes connected to lead parts of internal conductor layers, the longitudinally formed side surfaces can be effectively utilized. Thus, the multilayer capacitor can be made compact.

Preferably, the first to fourth internal conductor layers are stacked in this order repeatedly for a plurality of times in the stacking direction respectively across the dielectric layers; and the fifth to seventh internal conductor layers are stacked in this order repeatedly for a plurality of times in the stacking direction respectively across the dielectric layers According to the above configuration, not only does the electrostatic capacity of the multilayer capacitor become higher, but also the action of cancellation of the magnetic fields becomes further greater, the inductance is more greatly reduced, and the ESL is more greatly reduced.

Preferably, the cut parts formed on the first, fifth, third and seventh internal conductor layers have a substantial L-shape; and the cut parts formed on the second, sixth, fourth and eighth internal conductor layers have a substantial linear shape. When the cut parts are formed as such, it is easy to form channel parts in mutually reverse directions.

Preferably, in the first to third aspects of the present invention, a width of the cut part is 1/10 to 1/3, more preferably 1/8 to 1/4 of a width of the internal conductor layer. If the width of the cut part is too narrow, the insulation is not enough. If the width is too wide, the section of the conductor layer is reduced and the capacitance is reduced.

BRIEF DESCRIPTION OF DRAWINGS

Below, the present invention will be explained in detail with reference to the attached drawings, in which.

DESCRIPTION OF THE PREFERRED EMBODIMENTS

Below, an embodiment of a multilayer capacitor according to the present invention will be explained based on the drawings.

First Embodiment

A multilayer ceramic capacitor as an embodiment of the multilayer capacitor according to the present invention (hereinafter simply referred to as a "multilayer capacitor") 10 is shown in FIG. 1 to FIG. 5. As shown in these figures, the multilayer capacitor 10 is comprised of, as a main part, a dielectric body 12 comprised of a rectangular parallelepiped shaped sintered body obtained by sintering a stack of a plurality of ceramic green sheets as dielectric sheets (which become ceramic layers 12A after firing).

Figure 1:
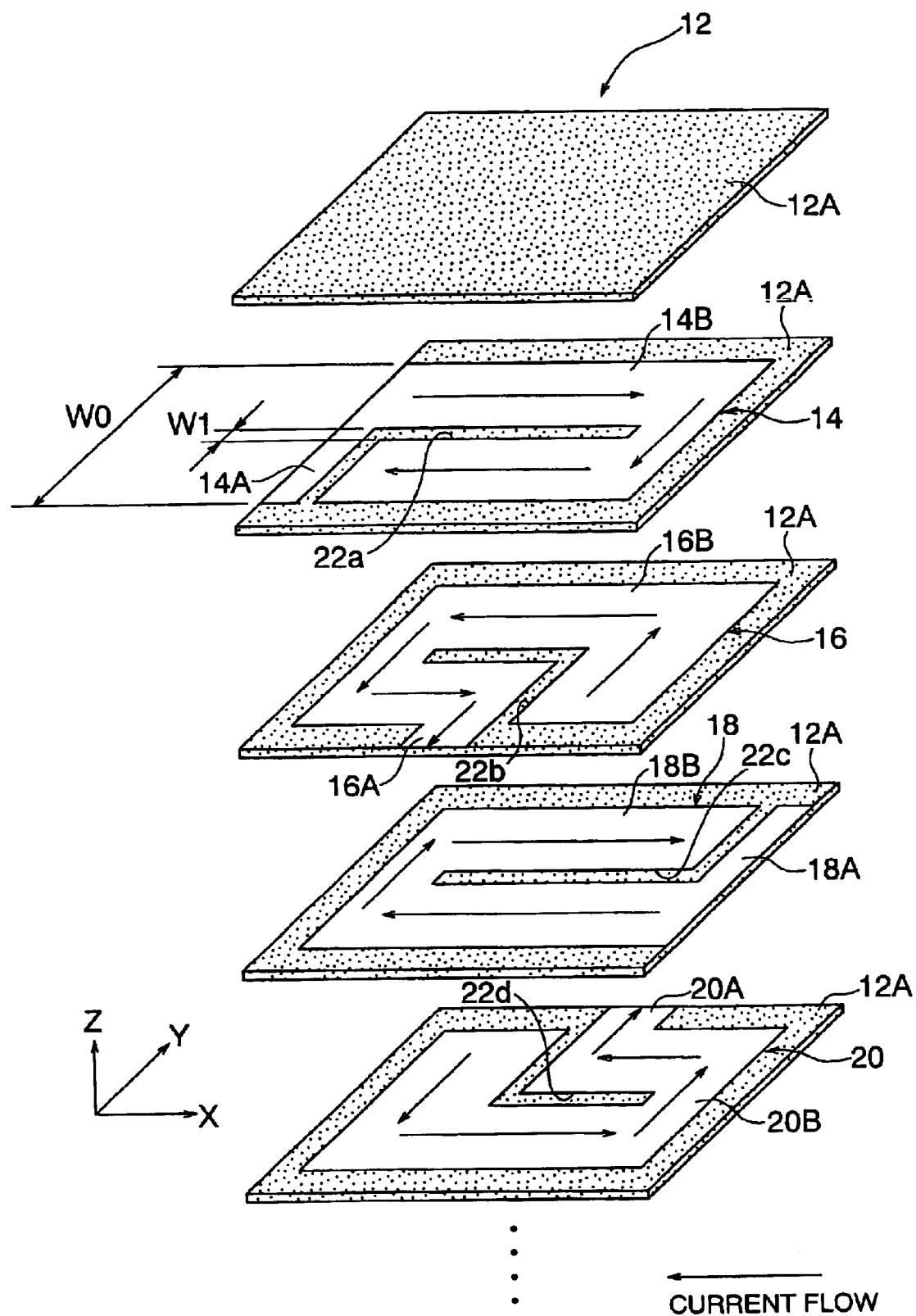
FIG. 1 is a disassembled perspective view of a multilayer capacitor according to a first embodiment of the present invention showing each pattern of internal conductor layers thereof.
Figure 3:
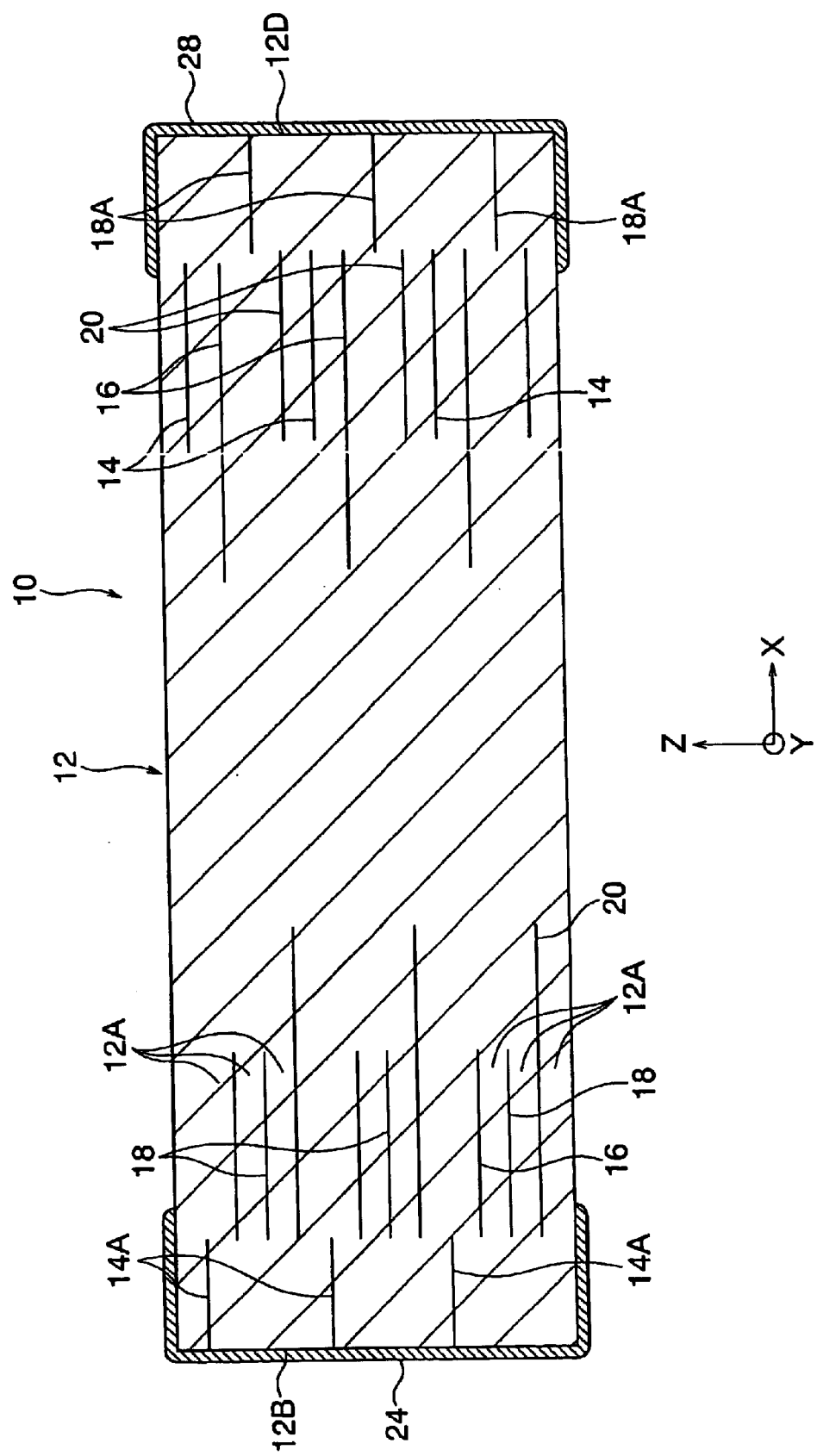
FIG. 3 is a sectional view along the line III—III in FIG. 2.
Figure 4:
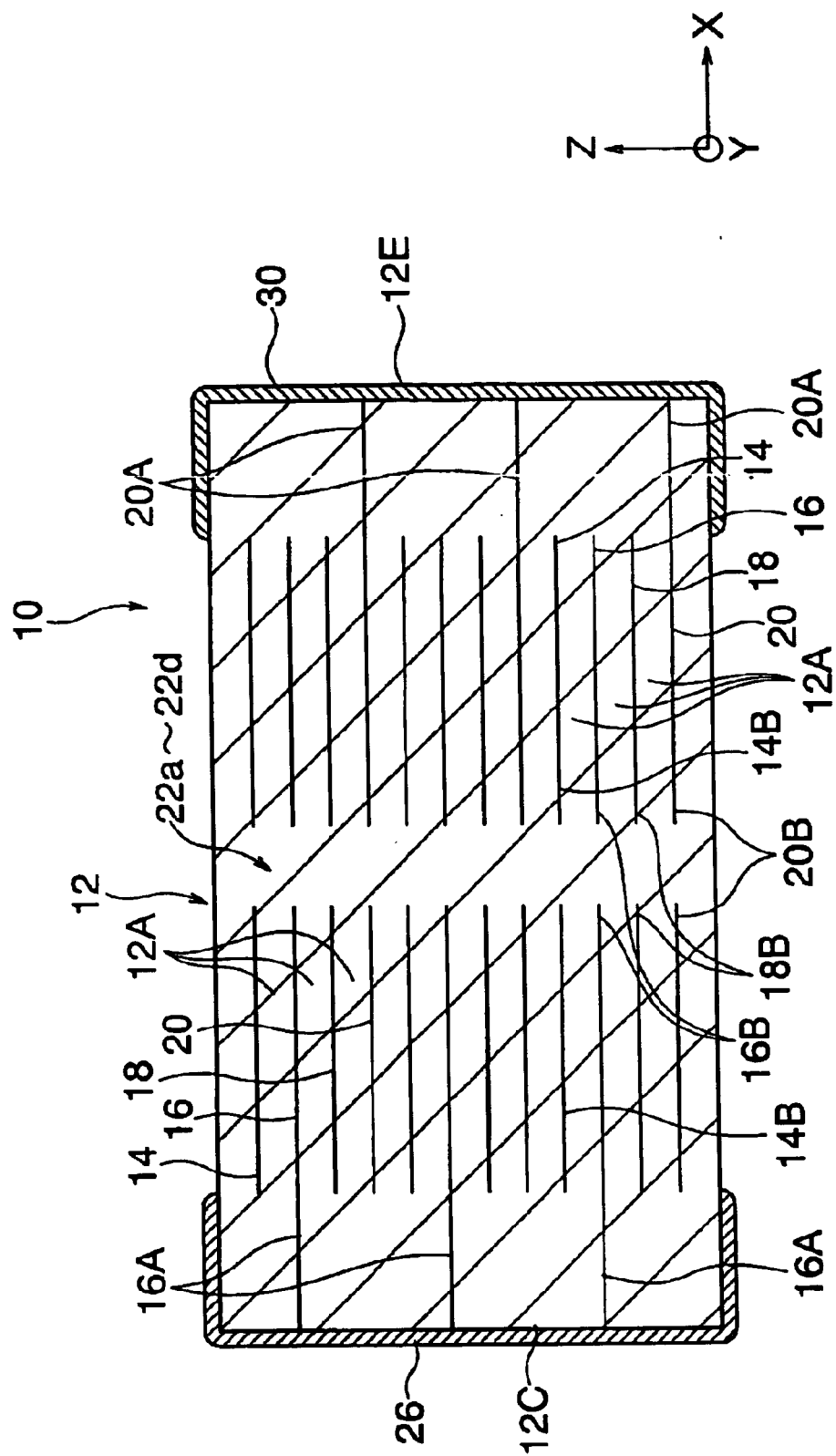
FIG. 4 is a sectional view along the line IV—IV in FIG. 3.

As shown in FIG. 1, FIG. 3 and FIG. 4, a planar shaped first internal conductor layer 14, wherein the plane is along the X-axis and Y-axis, is arranged at a position of a predetermined height in the stacking direction Z of the ceramic layers (dielectric layers) 12A in the dielectric body 12. In the dielectric body 12, the same planar shaped second internal conductor layer 16 is arranged below the internal conductor layer 14 over the ceramic layer 12A.

In the dielectric body 12, below the second internal conductor layer 16 in the stacking direction Z is arranged the same planar shaped third internal conductor layer 18 over a ceramic layer 12A. Below the internal conductor layer 18 in the stacking direction Z is arranged the same planar shaped fourth internal conductor layer 20. In this way, the first internal conductor layer 14 to the fourth internal conductor layer 20 are arranged facing to each other across the ceramic layers 12A in the dielectric body 12.

Namely, in the present embodiment, by respectively sandwiching the ceramic layers 12A as dielectric sheet after firing, the first internal conductor layer 14 to the fourth internal conductor layer 20 are arranged in order in the dielectric body 12. Moreover, below the fourth internal conductor layer 20 in the stacking direction Z is, as shown in FIG. 3 and FIG. 4, a set of the four layers, the first to fourth internal conductor layers 14 to 20 in the same order as above, is repeatedly stacked. For example, about 100 sets (3 sets in the figures) of the first to fourth internal conductor layers 14 to 20 are arranged in total.

The centers of these internal conductor layers 14, 16, 18 and 20 are arranged at substantially the same positions as the center of the dielectric body 12. Further, the vertical and horizontal dimensions of the internal conductor layers 14 to 20 are made smaller than the lengths of the corresponding sides of the dielectric body 12. Further, as the materials of the internal conductor layers 14, 16, 18 and 20 formed in substantially rectangular shapes, not only may base metal materials such as nickel, nickel alloys, copper, or copper alloys be considered, but also materials mainly comprised of these metals may be considered.

In the present embodiment, as shown in FIG. 1, first to fourth cut parts 22a to 22d respectively having its main parts extending in the right and left directions with respect to the X-axis direction are provided at the center portion of the internal conductor layers 14 to 20, respectively. These cut parts 22a to 22d have a substantial L-shape. A cut width W1 of the cut parts 22a to 22d is preferably 1/10 to 1/3, more preferably 1/8 to 1/4 of a width W0 of the internal conductors layers 14 to 20.

The first cut part 22a extends from the nearer side of the Y-axis direction near the left side of the first internal conductor layer 14 in the X-axis direction to the center portion of the conductor layer 14 in the Y-axis direction along the Y-axis direction, and extends from there to the right along the X-axis direction. The second cut portion 22b extends from the nearer side of the Y-axis direction near the center of the second internal conductor layer 16 in the X-axis direction to the center portion of the conductor layer 16 in the Y-axis direction, and extends from there to the left in the X-axis direction.

The third cut part 22c extends from the far side of the Y-axis direction near the right side of the third internal conductor layer 18 in the X-axis direction to the center portion of the conductor layer 18 in the Y-axis direction along the Y-axis direction, and extends from there to the left side along the X-axis direction. The fourth cut part 22d extends from the far side of the Y-axis direction near the center of the fourth internal conductor layer 20 in the X-axis direction to the center portion of the conductor layer 20 in the Y-axis direction along the Y-axis direction, and extends from there to the right side along the X-axis direction.

As a result that these cut portions 22a to 22d are formed, the internal conductor layers 14 to 20 are formed with first to fourth channel parts 14B to 20B for current to return and flow. Furthermore, due to the formation of these cut portions 22a to 22d, the first internal conductor layer 14 and the third internal conductor layer 18 have a planar pattern shape in point symmetry with respect to the center of these conductors. Also, the second internal conductor layer 16 and the fourth internal conductor layer 20 have a planar pattern shape in point symmetry with respect to the center of these conductors.

As shown in FIG. 1, the first internal conductor layer 14 is formed with a first lead part 14A led from the left end of the internal conductor layer 14 to the left side direction in the X-axis direction so as to be led out by the entire width W0 (the entire width in the Y-axis direction) of the internal conductor layer 14. Also, the second internal conductor layer 16 is formed a second lead part 16A led from the center portion on the nearer side of the Y-axis direction on its plane toward the nearer direction.

The third internal conductor layer 18 is formed with a lead part 18A led from a right-of-center portion in the X-axis direction on its plane to the right direction by the entire width W0 of the internal conductor layer 18. Also, the fourth internal conductor layer 20 is formed with a lead part 20A led from the center portion on the far side in the Y-axis direction on its plane to the far side direction.

Figure 2:
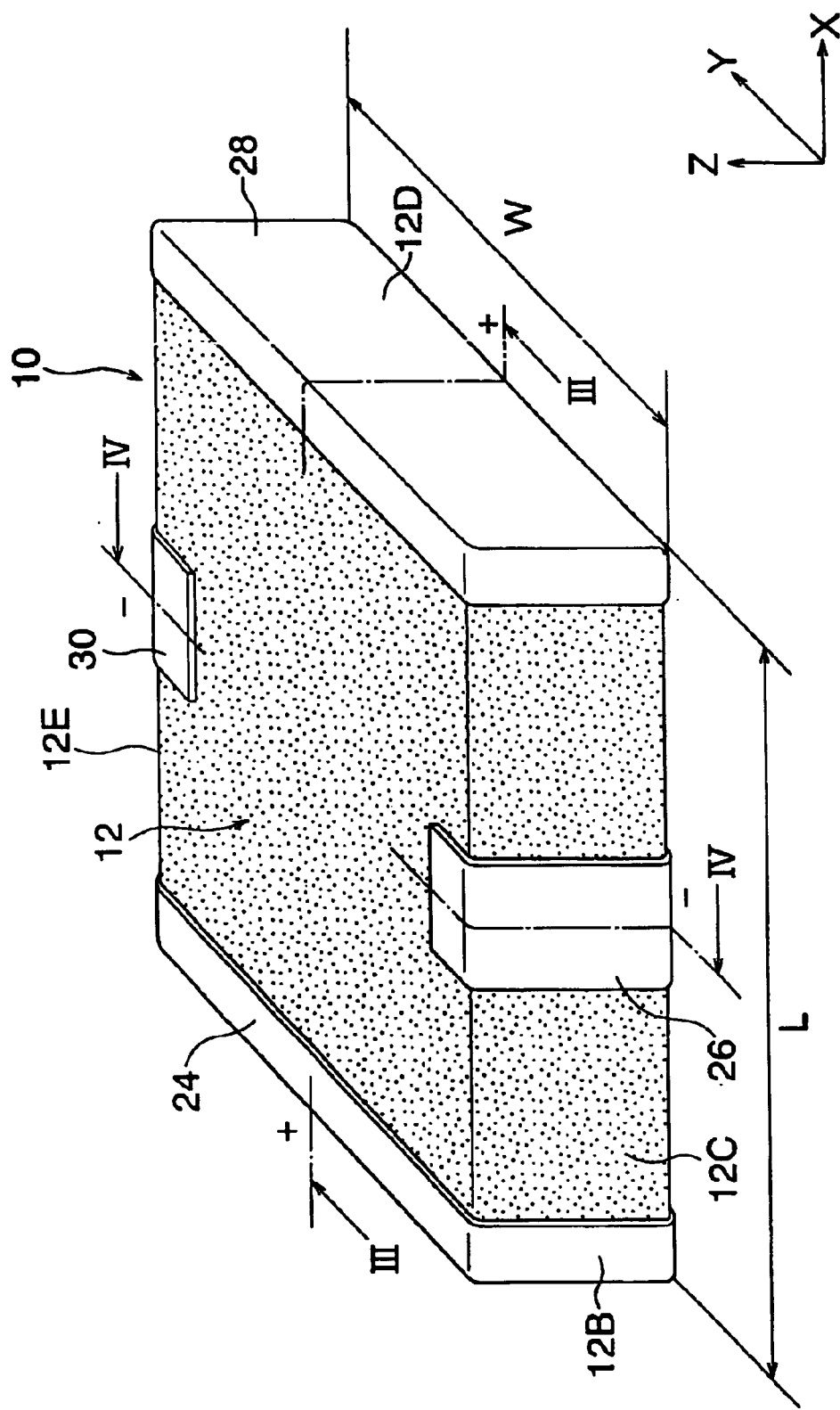
FIG. 2 is a perspective view of the multilayer capacitor in FIG. 1.

As a result, wide lead parts 14A and 18A led to the first side surface 12B and the third side surface 12D facing to each other on the right and left of the X-axis in the dielectric body 12 shown in FIG. 2 are provided to the internal conductor layers 14 and 18, respectively. Furthermore, the narrow lead parts 16A and 20A led to the second side surface 12C and fourth side surface 12E facing to each other on the nearer side and far side in the Y-axis direction of the dielectric body 12 are provided to the two internal conductor layers 16 and 20, respectively. The width of the lead parts 16A and 20A is, for example, approximately the same as that of the channel part 16B or 20B.

As shown in FIG. 2, the first side surface 12B on the left is provided with a first terminal electrode 24 having a size of covering the entire width of the side surface 12B so that the entire width of the first lead part 14A of the first internal conductor layer 14 is connected to the first lead part 14A. The third side surface 12D on the right is provided with a third terminal electrode 18 having a size of covering the entire width of the side surface 12D, so that the third lead part 18A of the third internal conductor layer 18 is connected to the third lead part 18A.

Also, a second side surface 12C on the nearer side is provided with a second terminal electrode 26 to be connected to the second internal conductor layer 16 via the second lead part 16A, and a fourth side surface 12E on the far side is provided with a fourth terminal electrode 30 to be connected to the fourth internal conductor layer 20 via the fourth lead part 20A. From the above, in the present embodiment, four side surfaces 12B to 12E of the dielectric body 12 being the rectangular parallelepiped, that is, a hexagonal shape, have the terminal electrodes 24 to 30 arranged at them, respectively.

Note that widths of the second terminal electrode 26 and the fourth terminal electrode 30 are the same as or wider than the width of the second lead part 16a and the fourth lead part 20a, but is narrower than the width L of the dielectric body 12 in the X-axis direction. It is preferably ⅛ to ½ of the width L, further preferably ⅙ to ⅓ or so of the width L. Also, the second terminal electrode 26 and the fourth terminal electrode 30 are respectively formed at the approximate center in the X-axis direction along the stacking direction Z on the side surfaces 12C and 12D of the dielectric body 12.

Figure 5:
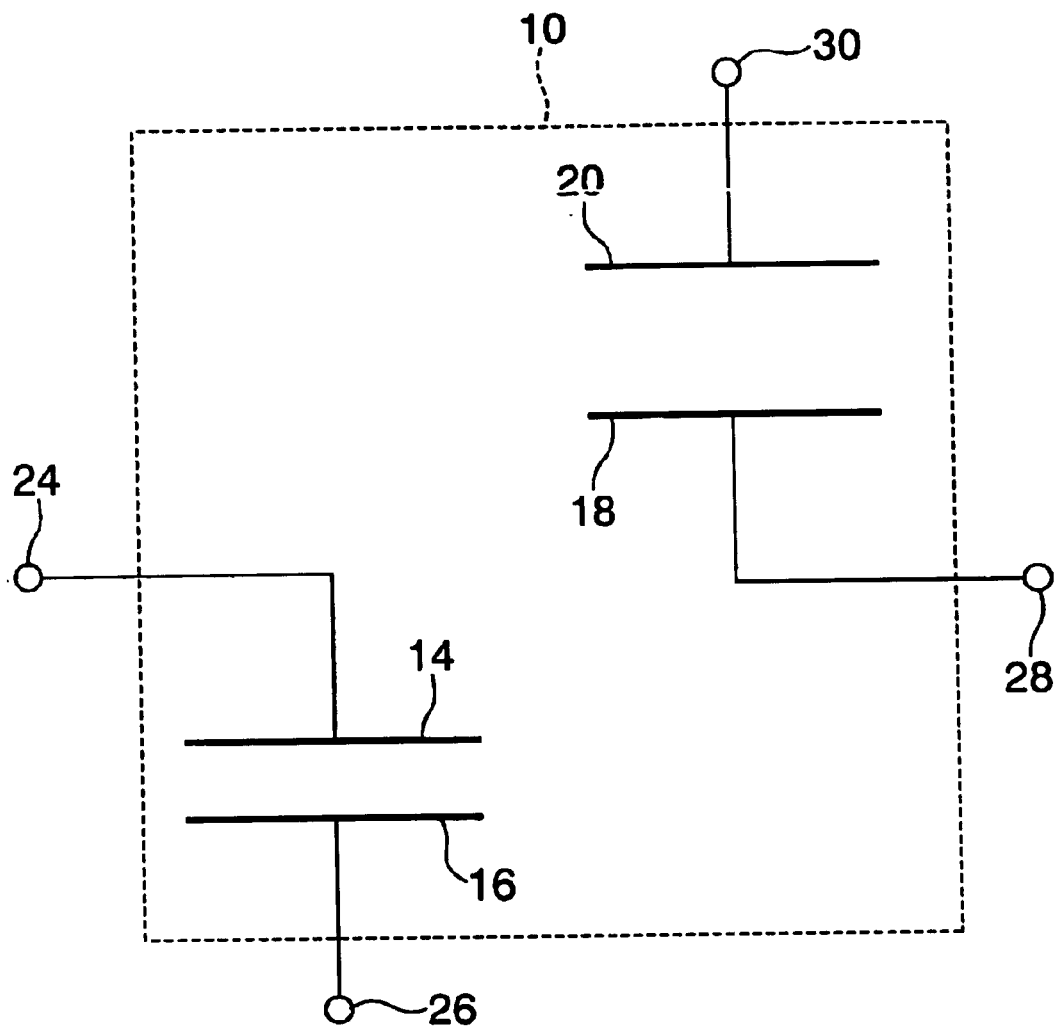
FIG. 5 is a view of an equivalent circuit of the multilayer capacitor shown in FIG. 1 to FIG. 4.

In the multilayer capacitor 10 of the present embodiment, as shown in FIG. 5, the internal conductor layers 14 and 16 become electrodes composing one capacitor by connecting the terminal electrode 24, for example, to an electrode of the CPU. Also, the terminal electrode 26 is connected, for example, to the ground side and terminal electrodes 24 and 26 thereof have mutually reverse polarities when used. In the same way, the terminal electrodes 28 and 30 have mutually reverse polarities when used, so that the internal conductor layers 18 and 20 become electrodes composing one capacitor.

Therefore, for example, as shown in FIG. 2, when the terminal electrodes 26 and 30 become negative electrodes at the moment the terminal electrodes 24 and 28 become positive electrodes, currents flow along the clockwise direction in the channel parts 14B and 18B of the internal conductor layers 14 and 18 respectively connected to the terminal electrodes 24 and 28 like the current direction shown by arrows in FIG. 1. Also, currents flow along the anticlockwise direction in the channel parts 16B and 20B of the internal conductor layers 16 and 20 respectively connected to the terminal electrodes 26 and 30.

From the above, currents flow in reverse directions from each other between the channel part 14B and the channel part 16B of the internal conductor layers 14 and 16 adjoining each other across the ceramic layer 12A. Similarly, currents flow in reverse directions from each other between the channel part 16B and the channel part 18B of the internal conductor layers 16 and 18 adjoining each other across the ceramic layer 12A. Similarly, currents flow in reverse directions from each other between the channel part 18B and the channel part 20B of the internal conductor layers 18 and 20 adjoining each other across the ceramic layer 12A.

Next, an operation of the multilayer capacitor 10 according to the present embodiment will be explained.

According to the multilayer capacitor 10 according to the present embodiment, a pair of internal conductor layers 14 and 16 face to each other and serve as electrodes of a capacitor arranged in parallel, and a pair of internal conductor layers 18 and 20 face to each other and serve as electrodes of a capacitor arranged in parallel.

Also, in the present embodiment, when powering up the multilayer capacitor 10, currents flow in reverse directions from each other between the channel parts 14B to 20B of the internal conductor layers 14 to 20 adjoining one another across the ceramic layers 12A. Therefore, magnetic fluxes generated by a high frequency current flowing in the internal conductor layers are mutually cancelled out, and the equivalent serial inductance (ESL) is reduced by reducing parasitic inductance of the multilayer capacitor 10 itself.

Furthermore, even in the identical internal conductor layers 14 to 20, currents flow in reverse directions from each other at each channel part 14B to 20B between portions positioning by sandwiching the cut parts 22, so that the equivalent serial inductance is further decreased.

From the above, the multilayer capacitor 10 according to the present embodiment attains further reduced ESL and widely reduced effective inductance. As a result, according to the present embodiment, a multilayer capacitor 10 capable of surely suppressing fluctuations of a power source voltage and being optimal as a CPU power source can be obtained.

Furthermore, in the present embodiment, since a plurality of sets of the internal conductor layers 14 to 20 are arranged in the dielectric body 12, not only heightening an electrostatic capacity of the multilayer capacitor 10, but an effect of canceling the magnetic field becomes furthermore larger, inductance is widely reduced and the ESL is further reduced.

Next, by using a network analyzer, an S21 characteristic of an S parameter is measured on each sample below, and the attenuation characteristic of each sample was obtained, respectively. First, the samples will be explained. Namely, the multilayer capacitor of the related art shown in FIG. 9, which is a general capacitor, is a comparative example 1, and the multilayer capacitor according to an embodiment shown in FIG. 2 is an example 1.

Figure 6:
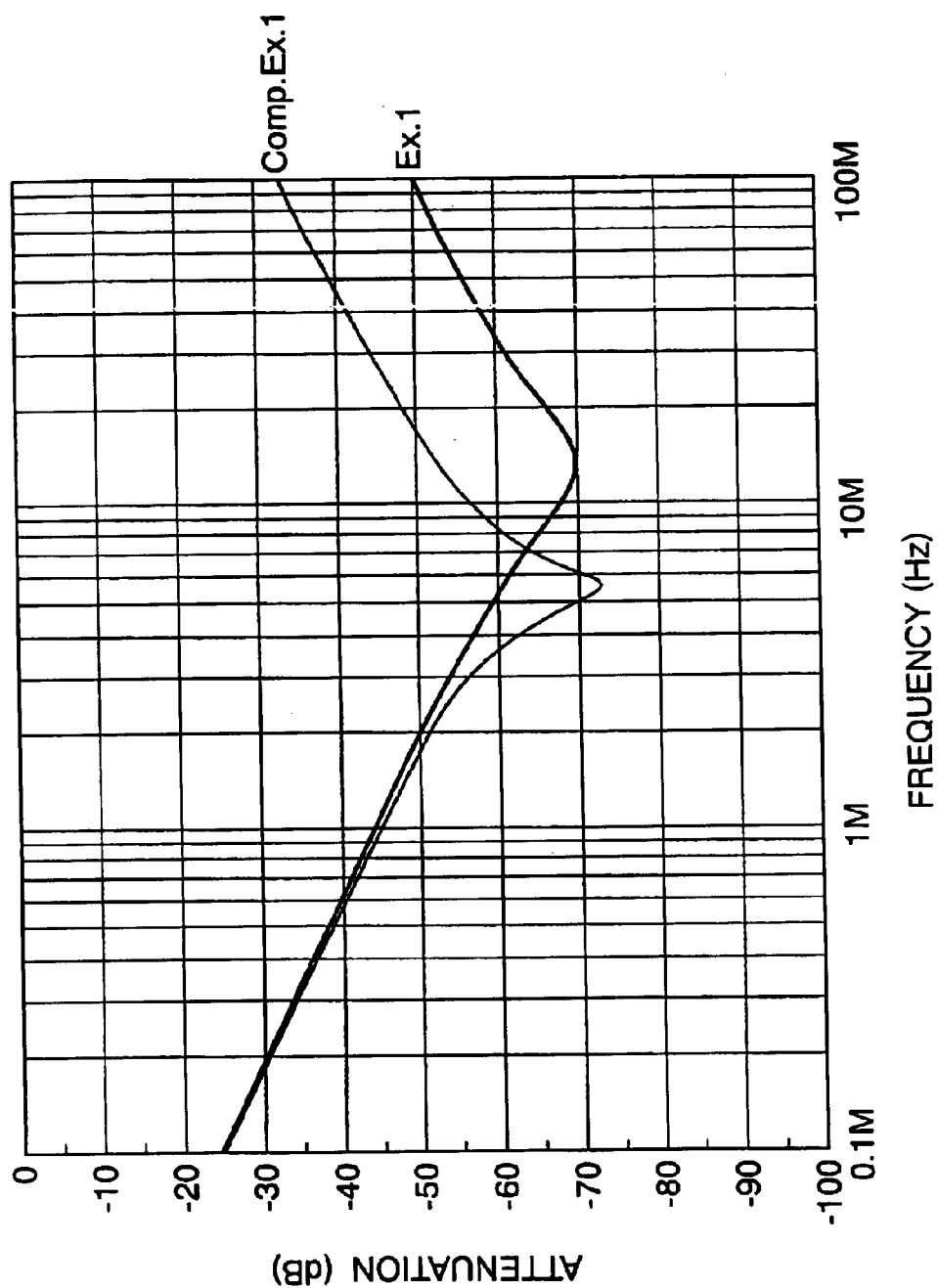
FIG. 6 is a graph of the attenuation characteristics of examples and comparative examples of the present invention.
Figure 7:
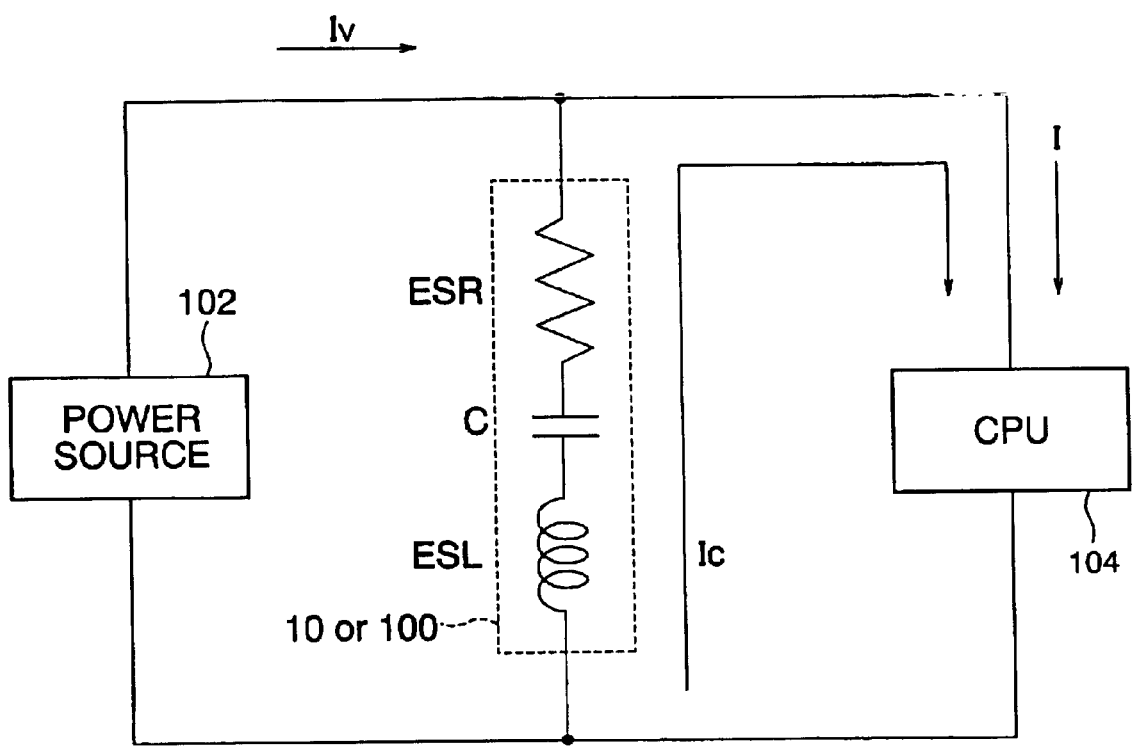
FIG. 7 is an example of a circuit in which a multilayer capacitor is installed.
Figure 8:
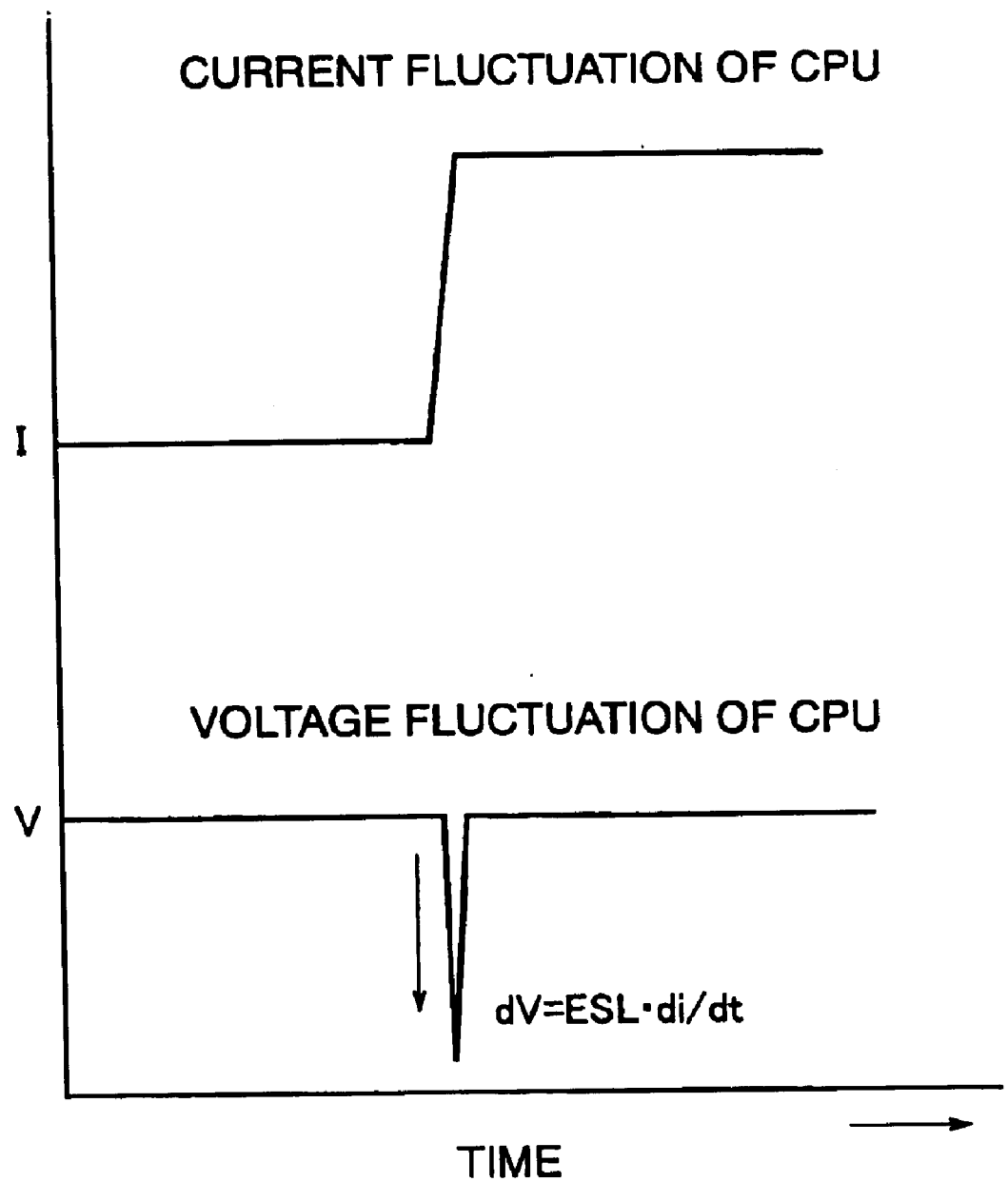
FIG. 8 is a graph of the relationship between current fluctuation and voltage fluctuation in a circuit employing a multilayer capacitor of the related art.

Here, constant values of an equivalent circuit were calculated so that the actual measured value of the attenuation characteristics matches with an attenuation amount of the equivalent circuit in the multilayer capacitor 100 shown in FIG. 7. It is known from data of the attenuation characteristics of each sample shown in FIG. 6 that an attenuation amount of the example 1 in the high frequency bandwidth of 20 MHz or more is increased by about 15 dB comparing with that in the comparative example. Therefore, it was confirmed from the data that high frequency characteristics were improved in the example.

Note that also the calculated ESL is widely reduced to 145.2 pH in the example 1 comparing with 845.3 pH in the comparative example 1, and the effect of the present invention was confirmed to be proved also by those values. Also, the equivalent serial resistance (ESR) was 7.8 mΩ in the example 1 while it was 5.5 mΩ in the comparative example 1.

Figure 9:
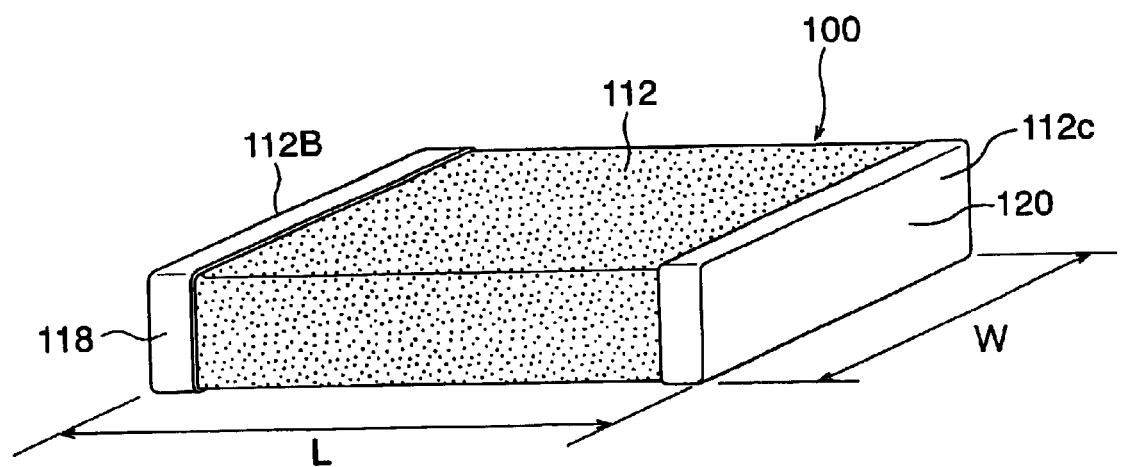
FIG. 9 is a perspective view of a multilayer capacitor according to the related art.
Figure 10:
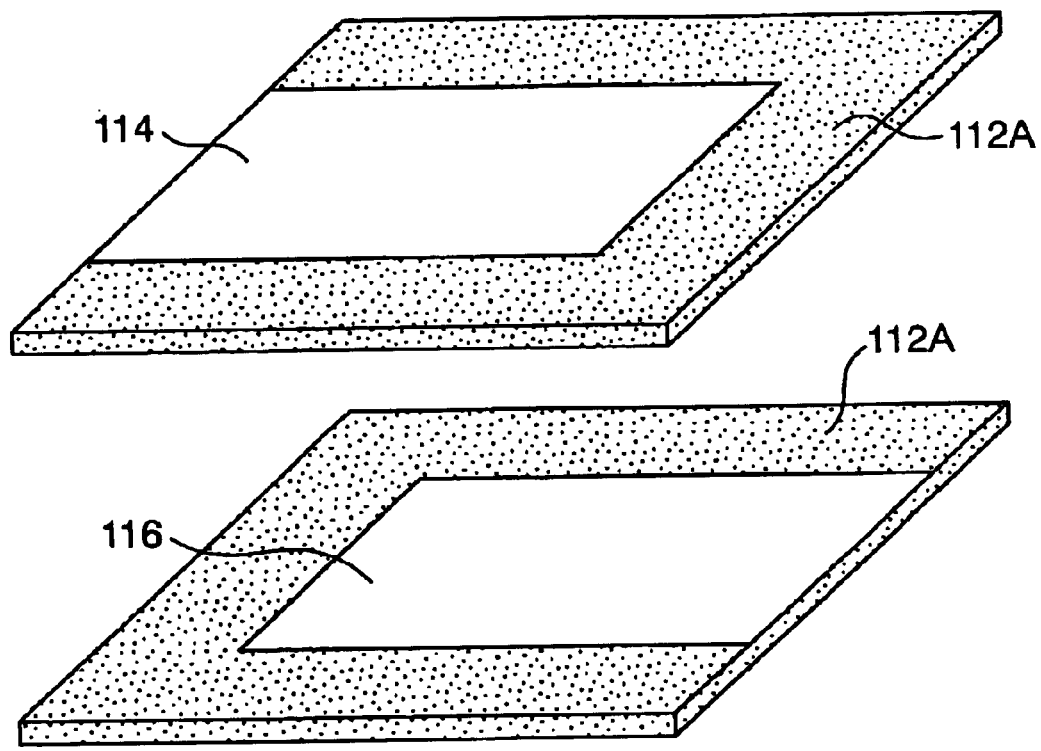
FIG. 10 is a disassembled perspective view of internal conductor layers of a multilayer capacitor shown in FIG. 9.

Dimensions of the samples used here were, as shown in FIG. 9 and FIG. 2, the length W and the length L were, in both the comparative example 2 and example 2 of the invention, W=1.25 mm and L=2.0 mm. Also, an electrostatic capacity of each sample used in the test was 1.001 $\mu$F in the comparative example 1 and 0.968 $\mu$F in the example 1.

Note that the multilayer capacitor 10 according to the above embodiment is configured to have two sets, that is four types in total, of internal conductor layers, but the number of layers is not limited to the number explained in the embodiment and may be larger.

Second Embodiment

Below, a multilayer capacitor accordance to a second embodiment of the present invention will be explained based on the drawings. The multilayer ceramic capacitor (hereinafter, simply referred to as a multilayer capacitor) 210 according to the present embodiment is shown in FIG. 11 to FIG. 14. As shown in these figures, the multilayer capacitor 210 is comprised of, as a main part, a dielectric body 212 comprised of a rectangular parallelepiped shaped sintered body obtained by sintering a stack of a plurality of ceramic green sheets as dielectric sheets (which become ceramic layers 212A after firing).

Figure 11:
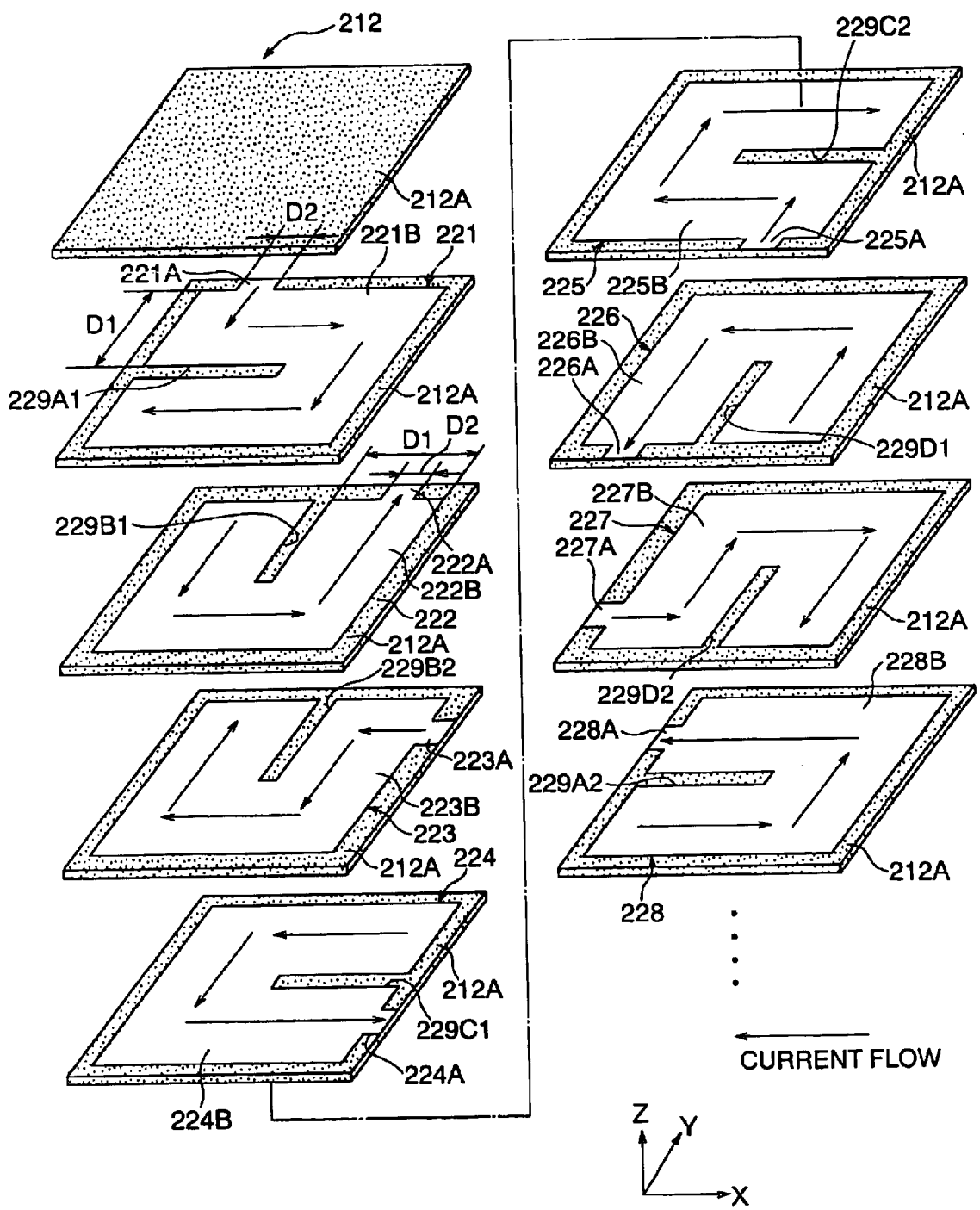
FIG. 11 is a disassembled perspective view of the multilayer capacitor according to another embodiment of the present invention, showing each pattern of internal conductor layers thereof.
Figure 13:
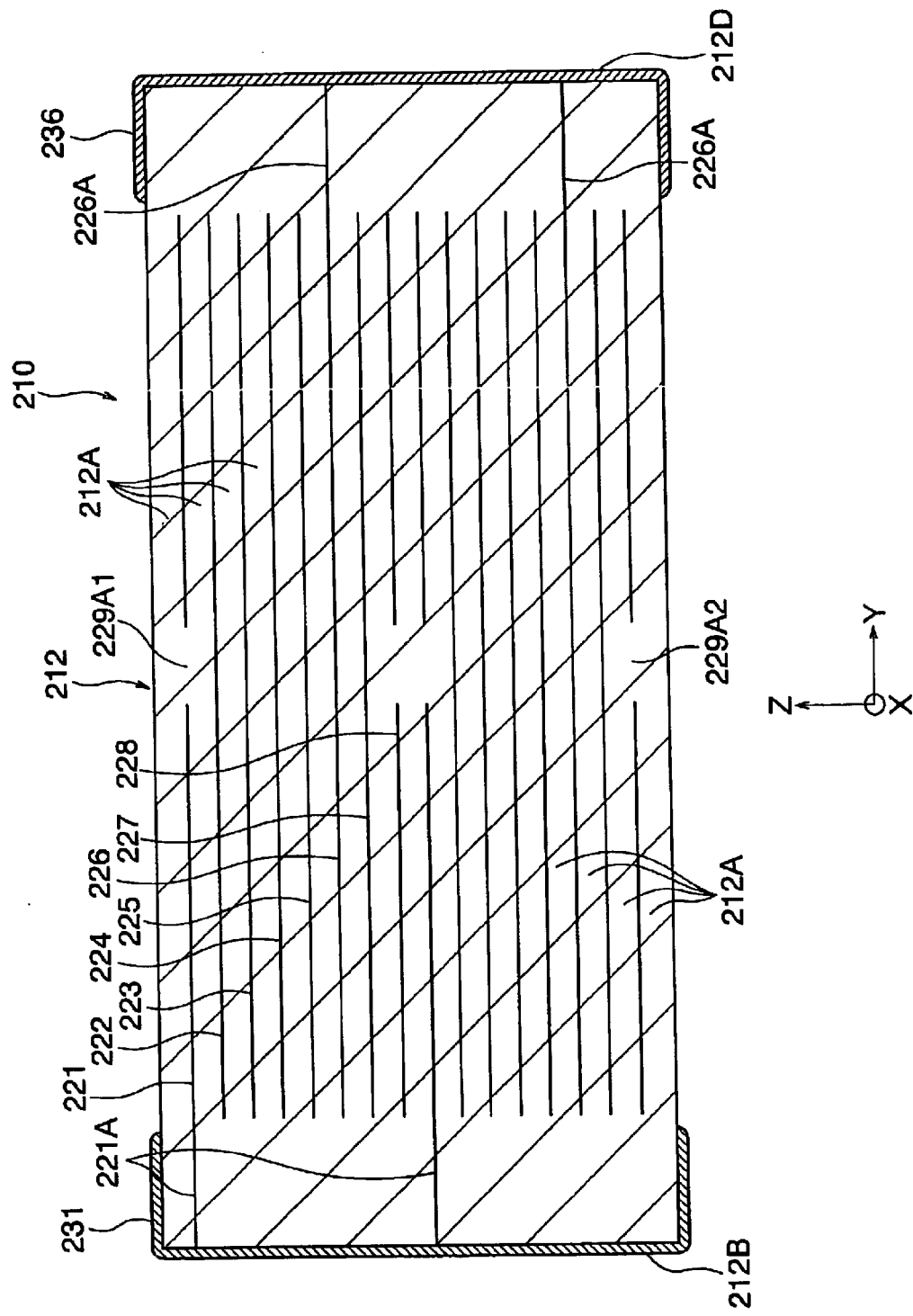
FIG. 13 is a sectional view along the line XIII—XIII in FIG. 12.

As shown in FIG. 11 and FIG. 13, a planar shaped first internal conductor layer 221, wherein the plane is along the X-axis and Y-axis, is arranged at a position of a predetermined height of the dielectric body 212. In the dielectric body 212, the same planar shaped second internal conductor layer 222 is arranged below the first internal conductor layer 221 in the stacking direction Z over the ceramic layer (dielectric layer) 212A.

In the dielectric body 212, below the second internal conductor layer 222 in the stacking direction Z is arranged the same planar shaped third internal conductor layer 223 over a ceramic layer 212A. Below the third internal conductor layer 223 in the stacking direction Z is arranged the same planar shaped fourth internal conductor layer 224 over a ceramic layer 212A in the dielectric body 212.

In the same way, a fifth internal conductor layer 225, a sixth internal conductor layer 226, a seventh internal conductor layer 227 and an eighth internal conductor layer 228 formed to be a planar shape are successively arranged separated by the ceramic layers 212A, respectively. Consequently, eight types of internal conductor layers from the internal conductor layer 221 to the internal conductor layer 228 are arranged to face to each other while separated by the ceramic layers 212A.

Namely, in the present embodiment, by sandwiching the ceramic layers 212A to be dielectric sheets after firing, the first internal conductor layer 221 to the eighth internal conductor layer 228 are arranged in order in the dielectric body 212. Furthermore, below the eighth internal conductor layer 228, for example, a total of several tens of sets (two sets in the figure) of the internal conductor layers as an eight-layer electrode are arranged by repeating the same order as above as shown in FIG. 13.

Namely, the centers of these internal conductor layers 221 to 228 are arranged at substantially the same positions as the center of the dielectric body 212. Further, the vertical and horizontal dimensions of the internal conductor layers 221 to 228 are made smaller than the lengths of the corresponding sides of the dielectric body 212. Further, as the materials of the internal conductor layers 221 to 228 formed in substantially rectangular shapes, not only may base metal materials such as nickel, nickel alloys, copper, or copper alloys be considered, but also materials mainly comprised of these metals may be considered.

As shown in FIG. 11, the first internal conductor layer 221 and the eighth internal conductor layer 228 are respectively formed a first cut part 229A1 and an eighth cut part 229A2 extending from the center portion in the Y-axis direction on the left side in the X-axis direction to the center portion along the X-axis direction. Also, the second internal conductor layer 222 and the third internal conductor layer 223 are respectively formed a second cut part 229B1 and a third cut part 229B2 extending from the center portion in the X-axis direction on the far side in the Y-axis direction to the center portion along the Y-axis direction.

Also, the fourth internal conductor layer 224 and the fifth internal conductor layer 225 are respectively formed a fourth cut part 229C1 and a fifth cut part 229C2 extending from the center portion in the Y-axis direction on the right side in the X-axis direction to the center portion along the X-axis direction. Also, the sixth internal conductor layer 226 and the seventh internal conductor layer 227 are respectively formed a sixth cut part 229D1 and a seventh cut part 229D2 extending from the center portion in the X-axis direction on the nearer side if the Y-axis direction to the center portion along the Y-axis direction.

In the present embodiment, the planar shape of these cut parts have a substantial linear shape extending from the center of the end portion in the X-axis direction or the Y-axis direction in each internal conductor layer to the center portion thereof. A width of the cut parts is the same as that in the first embodiment.

As a result that these cut portions 229A1 to 229D2 are formed, the internal conductor layers 221 to 228 are formed with first to eighth channel parts 221B to 228B for current to return and flow. Furthermore, due to the formation of these cut portions 229A1 to 229D2, the first internal conductor layer 221 and the fifth internal conductor layer 225 have a planar pattern shape in point symmetry with respect to the center of them. Also, the second internal conductor layer 222 and the sixth internal conductor layer 226 have a planar pattern shape in point symmetry with respect to the center of them.

Also, the third internal conductor layer 223 and the seventh internal conductor layer 227 have a planar pattern shape in point symmetry with respect to the center of them. Also, the fourth internal conductor layer 224 and the eighth internal conductor layer 228 have a planar pattern shape in point symmetry with respect to the center of them.

Figure 12:
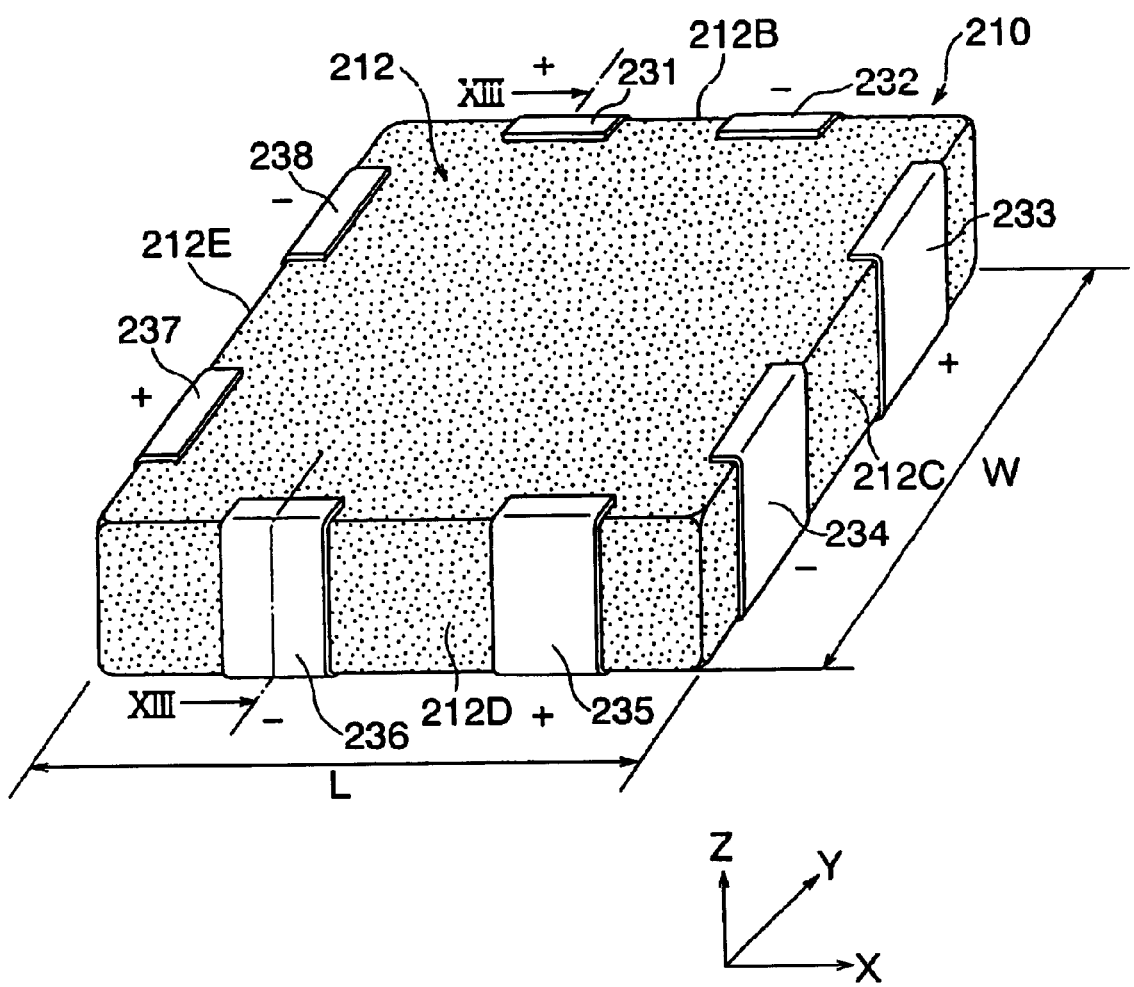
FIG. 12 is a perspective view of the multilayer capacitor shown in FIG. 11.

As shown in FIG. 11 and FIG. 12, the first internal conductor layer 221 has a first lead part 221A led to the first side surface 212B of the dielectric body 212. The second internal conductor layer 222 has a second lead part 222A lead to a different position from the first lead part 221A on the first side surface 212B of the dielectric body 212.

Also, the fifth internal conductor layer 225 has a fifth lead part 225A led to the third side surface 212D on the opposite side of the first side surface 212B of the dielectric body 212. The sixth internal conductor layer 226 has a sixth lead part 226A led to at a different position from the fifth lead part 225A on the third side surface 212D of the dielectric body 212.

The third internal conductor layer 223 has a third lead part 223A led toward the second side surface 212C being different from the first side surface 212B and the third side surface 212D of the dielectric body 212. The fourth internal conductor layer 224 has a fourth lead part 224A led to at a different position from the third lead part 223A on the second side surface 212C of the dielectric body 212.

The seventh internal conductor layer 227 has a seventh lead part 227A led to the fourth side surface 212E on the opposite side of the second side surface 212C of the dielectric body 212. The eighth internal conductor layer 228 has an eighth lead part 228A led to at a different position from the seventh lead part 227A on the fourth side surface 212E of the dielectric body 212.

A width D2 of the lead parts 221A to 228A is ⅓ to ¼ of a width of the channel portions 221B to 228B in the respective internal conductor layers.

As shown in FIG. 12, the first side surface 212B of the dielectric body 212 is attached with a first terminal electrode 231 and a second terminal electrode 232 respectively connected to the first lead part 221A and the second lead part 222A. The second side surface 212C of the dielectric body 212 is attached with a third terminal electrode 233 and a fourth terminal electrode 234 respectively connected to the third lead part 223A and the fourth lead part 224A.

The third side surface 212D of the dielectric body 212 is attached with a fifth terminal electrode 235 and a sixth terminal electrode 236 respectively connected to the fifth lead part 225A and the sixth lead part 226A. The fourth side surface 212E of the dielectric body 212 is attached with a seventh terminal electrode 237 and a eighth terminal electrode 238 respectively connected to the seventh lead part 227A and the eighth lead part 228A.

Namely, two of the lead parts 221A to 228A shown in FIG. 11 are led respectively to each of the four side surfaces 212B to 212E of the dielectric body 212 shown in FIG. 12 and connected to terminal electrodes 231 to 238, respectively. A width of the terminal electrodes 231 to 238 is the same as or more than the width D2 of the lead parts 221A to 228A shown in FIG. 11 and is determined so that the terminal electrodes adjoining each other are insulated.

As explained above, in the present embodiment, each of the four side surfaces 212B to 212E of the dielectric body 212 in a parallelepiped hexahedron shape is arranged two of the terminal electrodes 231 to 238, respectively, and the eight internal conductor layers 221 to 228 and the terminal electrodes 231 to 238 are connected via the lead parts 221A to 228A, respectively.

Figure 14:
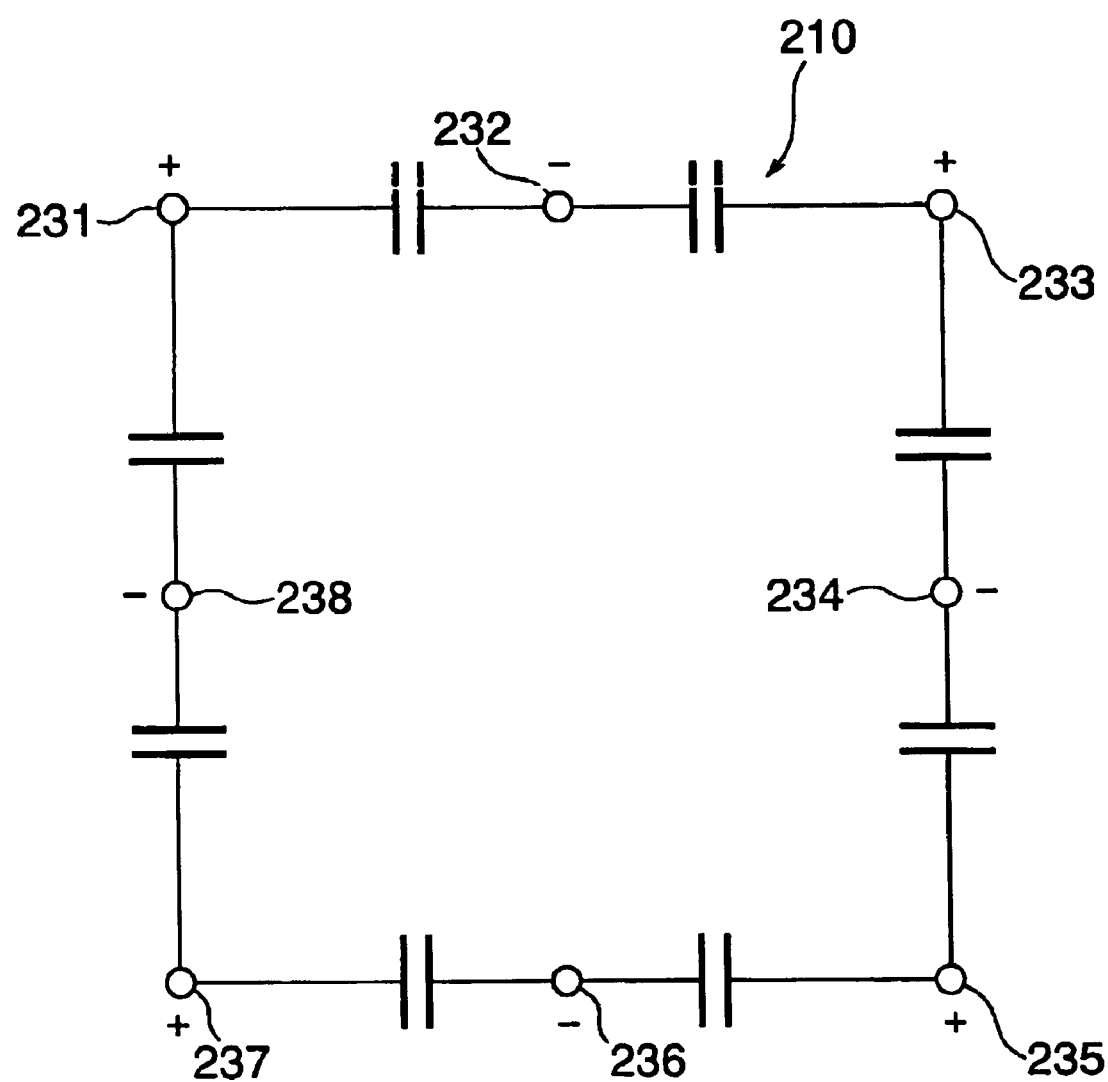
FIG. 14 is a view of an equivalent circuit of the multilayer capacitor shown in FIG. 11 to FIG. 13.

In the multilayer capacitor 210 according to the present embodiment, for example as shown in FIG. 14, terminal electrodes 231, 233, 235 and 237 are connected, for example, to electrodes of a CPU, and every other terminal electrodes 232, 234, 236 and 238 are connected, for example, to the ground side. Therefore, the terminal electrodes 231, 233, 235 and 237 and the terminal electrodes 232, 234, 236 and 238 are applied with voltages having reverse polarities.

As a result, for example as shown in FIG. 12 and FIG. 14, the every other terminal electrodes 231, 233, 235 and 237 become positive electrodes, while the every other terminal electrodes 232, 234, 236 and 238 become negative electrodes. At this time, currents flow in the direction indicated by arrows in FIG. 11.

Namely, currents flow in the clockwise direction in the channel parts 221B, 223B, 225B and 227B of the internal conductor layers 221, 223, 225 and 227 respectively connected to the terminal electrodes 231, 233, 235 and 237. Also, currents flow in the anticlockwise direction in the channel parts 222B, 224B, 226B and 228B of the internal conductor layers 222, 224, 226 and 228 respectively connected to the terminal electrodes 232, 234, 236 and 238.

As explained above, currents in the mutually reverse directions flow in the channel part 221B and the channel part 222B of the internal conductor layers 221 and 222 adjoining across a ceramic layer 212A. In the same way, currents in mutually reverse directions flow in the channel part 222B and the channel part 223B of the internal conductor layers 222 and 223 adjoining across a ceramic layer 212A.

In the same way, between the channel part 223B and the channel part 224B of the internal conductor layers 223 and 224 adjoining across a ceramic layer 212A, between the channel part 224B and the channel part 225B of the internal conductor layers 224 and 225 adjoining across a ceramic layer 212A, between the channel part 225B and the channel part 226B of the internal conductor layers 225 and 226 adjoining across a ceramic layer 212A, between the channel part 226B and the channel part 227B of the internal conductor layers 226 and 227 adjoining across a ceramic layer 212A, between the channel part 227B and the channel part 228B of the internal conductor layers 227 and 228 adjoining across a ceramic layer 212A, and between the channel part 228B and the channel part 221B of the internal conductor layers 228 and 221 adjoining across a ceramic layer 212A, currents in mutually reverse directions flow.

Next, an operation of the multilayer capacitor 210 according to the present embodiment will be explained.

According to the multilayer capacitor 210 according to the present embodiment, when powering up the multilayer capacitor 210, currents flow as polarities of adjoining terminal electrodes become different to each other to be alternately a positive electrode and a negative electrode in the terminal electrodes 231 to 238. Thus, magnetic fluxes generated in the lead parts 221A to 228A are cancelled out as a result that currents in reverse directions flow between adjoining lead parts, and the effect of reducing the equivalent serial inductance is obtained.

Furthermore, in the present embodiment, when powering up the multilayer capacitor 210, currents flow in reverse directions from each other between the channel parts of internal conductor layers adjoining across a ceramic layer 212A in the channel parts 221B to 228B of the internal conductor layers 221 to 228. Along with this, the magnetic fluxes generated by the high frequency current flowing in the internal conductor layers are canceled out. By reducing the parasitic inductance of the multilayer capacitor 10 itself, the equivalent serial inductance (ESL) is furthermore reduced.

Further, even in the same internal conductor layers 221 to 228, the current flowing directions become reverse respectively between the parts positioned across the cut parts 229A to 229D of the channel parts 221B to 228B. Thus, the equivalent serial inductance is furthermore reduced.

From the above, in the multilayer capacitor 210 according to the present embodiment, the ESL is widely reduced and the effective inductance is widely reduced. As a result, according to the present embodiment, fluctuations of a power source voltage can be surely suppressed and a multilayer capacitor 210 most suitable to the CPU power source is obtained.

Furthermore, in the present embodiment, since the eight types of internal conductor layers 221 to 228 are arranged by the number of two or more each in the dielectric body 212, not only does the electrostatic capacity of the multilayer capacitor 210 become higher, but also the action of cancellation of the magnetic fields becomes further greater, the inductance is more greatly reduced, and the ESL is more greatly reduced.

Next, by using a network analyzer, the Sz1 characteristic of an S parameter of each sample below was measured and the attenuation characteristics of each sample were obtained. First, each sample will be explained. Namely, the multilayer capacitor shown in FIG. 9 as a general capacitor is a comparative example 2, and the multilayer capacitor according to the embodiment shown in FIG. 12 is an example 2.

Figure 15:
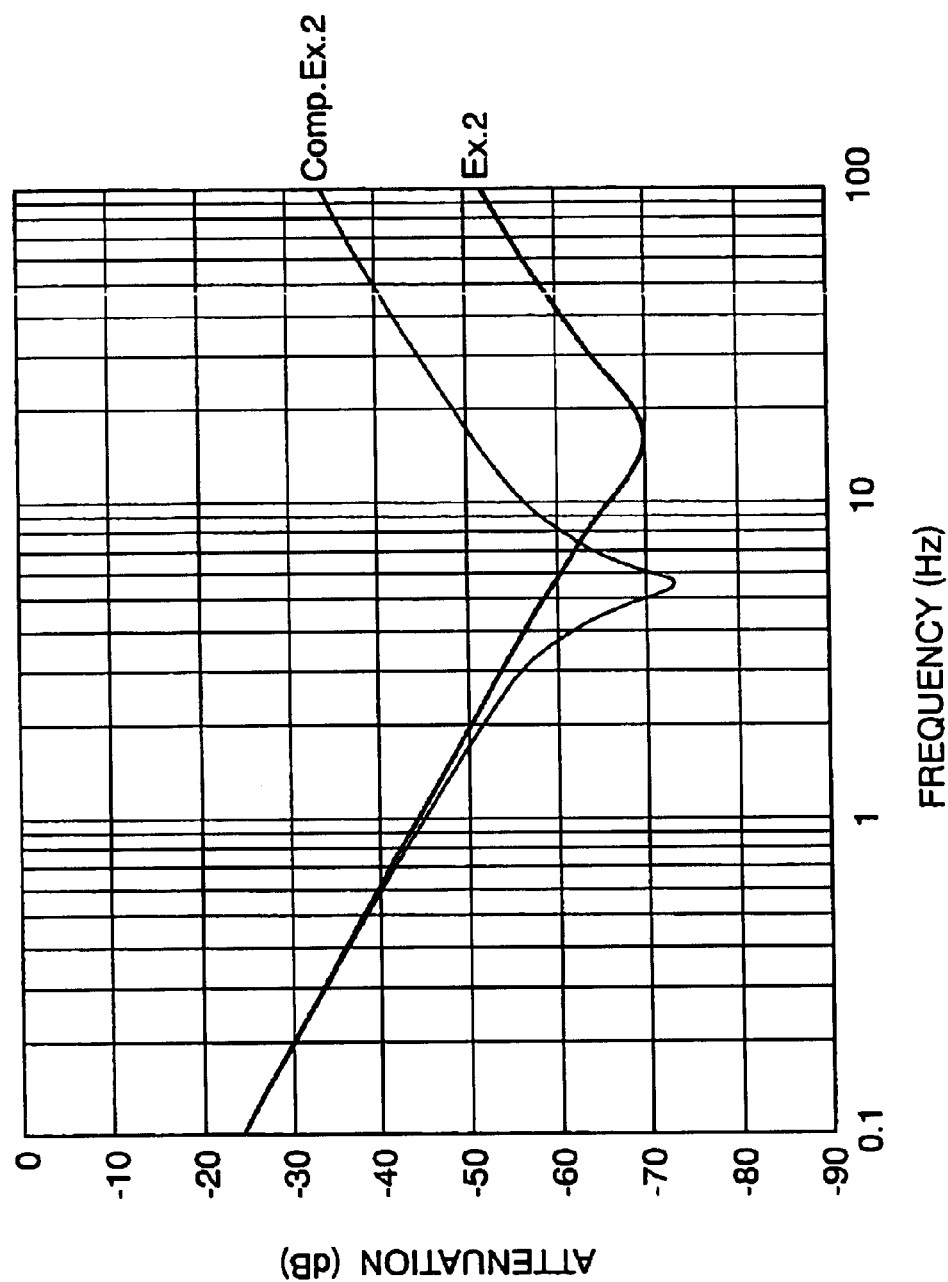
FIG. 15 is a graph of the attenuation characteristics of examples and comparative examples of the present invention.

Here, the constants of the equivalent circuit were calculated so that the measured value of the attenuation characteristic and the amount of attenuation of the equivalent circuit in the multilayer capacitor 100 shown in FIG. 7 matched. Further, from the data of the attenuation characteristics of the samples shown in FIG. 15, it is learned that a resonance point of the example 2 becomes 15 MHz from 4.5 MHz of the comparative example 2, and an attenuation amount of the example 2 at a frequency of 15 MHz or more is increased by about 15 dB compared with that of the comparative example 2. Therefore, from the data, it can be understood that improvement of the high frequency characteristics is seen in the example.

Also, the result of the ESL obtained by measuring with an impedance analyzer and calculating was widely reduced to 105.2 pH in the example 2 compared with 845.3 pH of the comparative example 2. Note that the equivalent serial resistance (ESR) was 5.5 mΩ in the comparative example 2 and 8.2 mΩ in the example 2.

Here, relating to the dimensions of the samples used, as shown in FIG. 9 and FIG. 12, the length W and the length L were, in both the comparative example 2 and example 2 of the invention, W=1.25 mm and L=2.0 mm. Further, the electrostatic capacities of the samples used for the tests were 1.00 $\mu$F for the comparative example 2 and 0.98 $\mu$F for the example of the invention.

Note that the multilayer capacitor 210 according to the present embodiment is configured to have eight types of internal conductor layers, but the number of the layers is not limited to the number explained in the embodiment and may be a larger number. Also, in the above embodiment, adjoining terminal electrodes had mutually reverse polarities, and along with this, the internal conductor layers are arranged so that mutually facing terminal electrodes have reverse polarities in the above embodiment.

Third Embodiment

A multilayer ceramic capacitor (hereinafter, simply referred to as a multilayer capacitor) 310 as a third embodiment of the multilayer capacitor according to the present invention is shown in FIG. 16 to FIG. 21. As shown in the figures, the multilayer capacitor 310 is comprised of, as a main part, a dielectric body 312 comprised of a rectangular parallelepiped shaped sintered body obtained by sintering a stack of a plurality of ceramic green sheets as dielectric sheets (which become ceramic layers 312A after firing).

Figure 16:
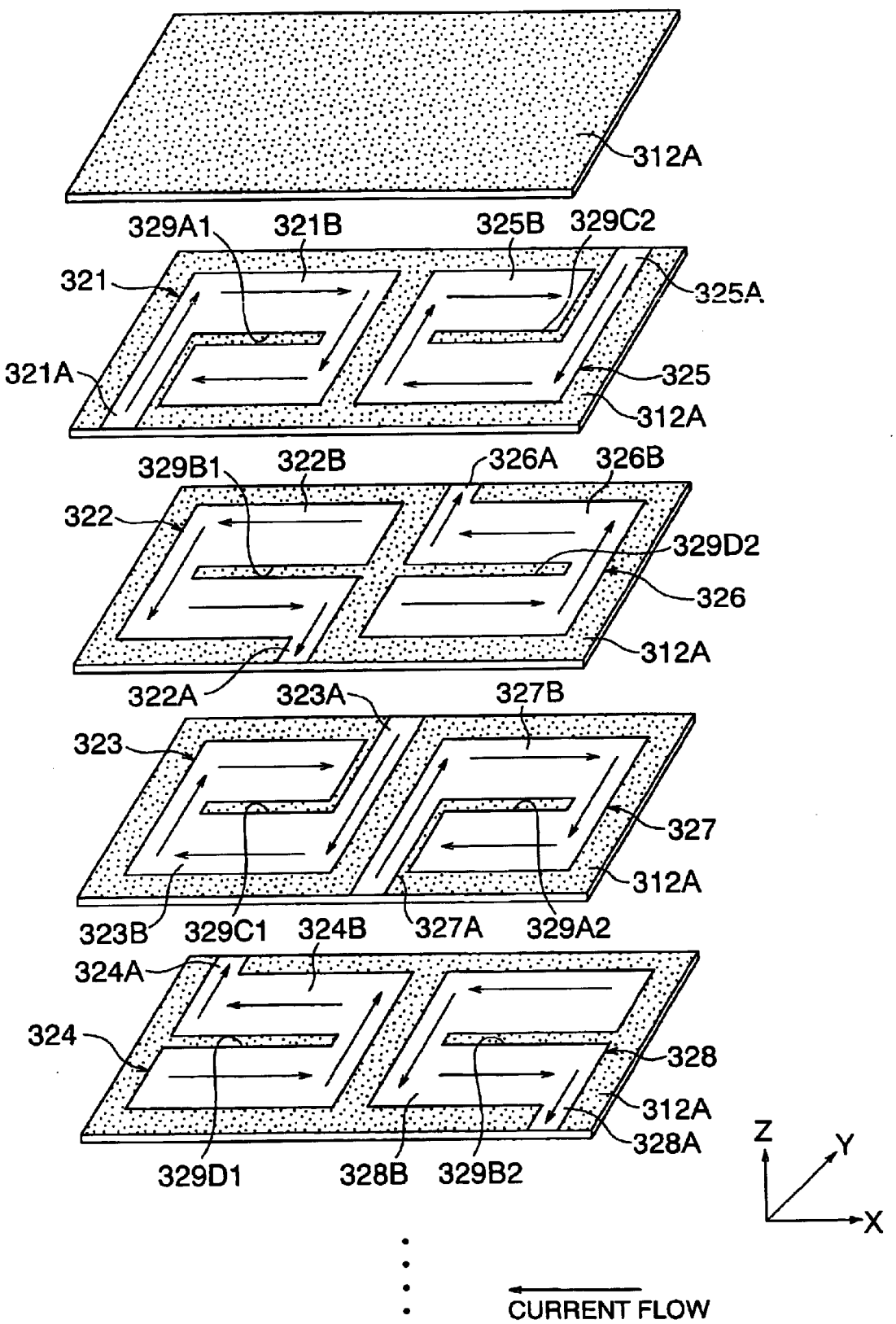
FIG. 16 is a disassembled perspective view of a multilayer capacitor according to another embodiment of the present invention, showing each pattern of internal conductor layers thereof.
Figure 18:
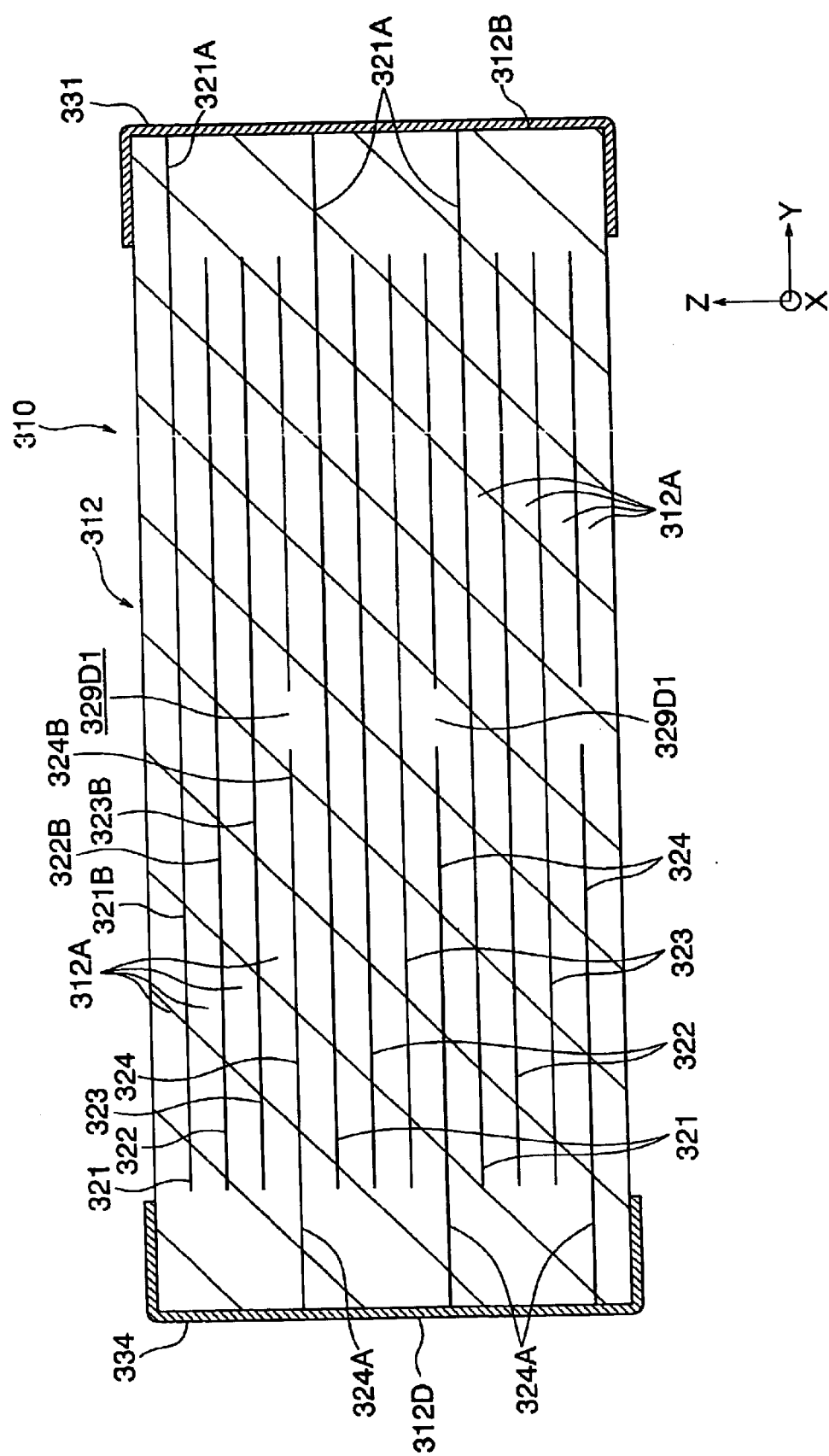
FIG. 18 is a sectional view along the line XVIII—XVIII in FIG. 17.

As shown in FIG. 16 and FIG. 18, a planar shaped first internal conductor layer 321, wherein the plane is along the X-axis and Y-axis, is arranged at a position of a predetermined height in the stacking direction Z of the ceramic layers (dielectric layers) 312A in the dielectric body 312. On the ceramic layer 312A to be formed a first conductor layer 321, a fifth internal conductor layer 325 is formed adjacent to the first internal conductor layer 321 by being insulated with the first internal conductor layer 321 and leaving a predetermined space in the X-axis direction on the same plane.

Below the first internal conductor layer 321 and the fifth internal conductor layer 325 in the Z-axis direction is formed is formed, by sandwiching a ceramic layer 312A, a second internal conductor layer 322 and a sixth internal conductor layer 326 having corresponding patterns to those of the first internal conductor layer 321 and the fifth internal conductor layer 325, respectively.

Below the second internal conductor layer 322 and the sixth internal conductor layer 326 in the Z-axis direction is formed, by sandwiching a ceramic layer 312A, a third internal conductor layer 323 and a seventh internal conductor layer 327 having corresponding patterns to those of the second internal conductor layer 322 and the sixth internal conductor layer 326, respectively.

Below the third internal conductor layer 323 and the seventh internal conductor layer 327 in the Z-axis direction is formed, by sandwiching a ceramic layer 312A, a fourth internal conductor layer 324 and a eighth internal conductor layer 328 having corresponding patterns to those of the third internal conductor layer 323 and the seventh internal conductor layer 327, respectively.

Below the fourth internal conductor layer 324 and the eighth internal conductor layer 328 in the Z-axis direction is, by sandwiching a ceramic layer 312A, in the same way as the above, a plurality of sets of a first to fourth internal conductor layers 321 to 324 and the fifth to eighth internal conductor layers 325 to 328 arranged in this order. As the materials of the internal conductor layers 325 and 328, not only may base metal materials such as nickel, nickel alloys, copper, or copper alloys be considered, but also materials mainly comprised of these metals may be considered.

At least one of cut parts 329A1 to 329D2 is formed on the first to eighth internal conductor layers 321 to 328, and the internal conductor layers are formed channel parts 321B to 328B for current to return and flow by the cut portions, respectively.

In the present embodiment, the cut parts 329A1, 329C2, 329C1 and 329A1 formed on the first, fifth, third and seventh internal conductor layers 321 325, 323 and 327 have a substantial L-shape. Also, the cut parts 329B1, 329D2, 329D1 and 329B2 formed on the second, sixth, fourth and eighth internal conductor layers 322 326, 324 and 328 have a substantial linear shape.

The cut parts 329A1 and 329A2 have the same pattern, the cut parts 329B1 and 329B2 have the same pattern, the cut parts 329C1 and 329C2 have the same pattern and the cut parts 329D1 and 329D2 have the same pattern.

The cut parts 329A1 to 329D2 are formed to have the symmetrical relationship as explained below between the internal conductor layers. Namely, the first internal conductor layer 321 and the third internal conductor layer 323 have a symmetric plane pattern with respect to the center of them. Also, the second internal conductor layer 322 and the fourth internal conductor layer 324 have a symmetric plane pattern with respect to the center of them.

The fifth internal conductor layer 325 and the seventh internal conductor layer 327 have a symmetric plane pattern with respect to the center of them. The sixth internal conductor layer 326 and the eighth internal conductor layer 328 have a symmetric plane pattern with respect to the center of these conductors.

Furthermore, the first internal conductor layer 321 and the fifth internal conductor layer 325 have a symmetric plane pattern with respect to the center of a space between them. The second internal conductor layer 322 and the sixth internal conductor layer 326 have a symmetric plane pattern with respect to the center of a space between them.

The third internal conductor layer 323 and the seventh internal conductor layer 327 have a symmetric plane pattern with respect to the center of a space between them. The fourth internal conductor layer 324 and the eighth internal conductor layer 328 have a symmetric plane pattern with respect to the center of a space between them.

By providing the cut parts 329A1 to 329D2 to the internal conductor layers to form the above plane pattern shapes, currents in mutually reverse directions flow between channel parts of internal conductor layers adjoining across a ceramic layer (dielectric layer) 312A in the stacking direction Z. Furthermore, currents also flow in mutual reverse directions between adjoining internal conductor layers positioned on the same plane.

Figure 17:
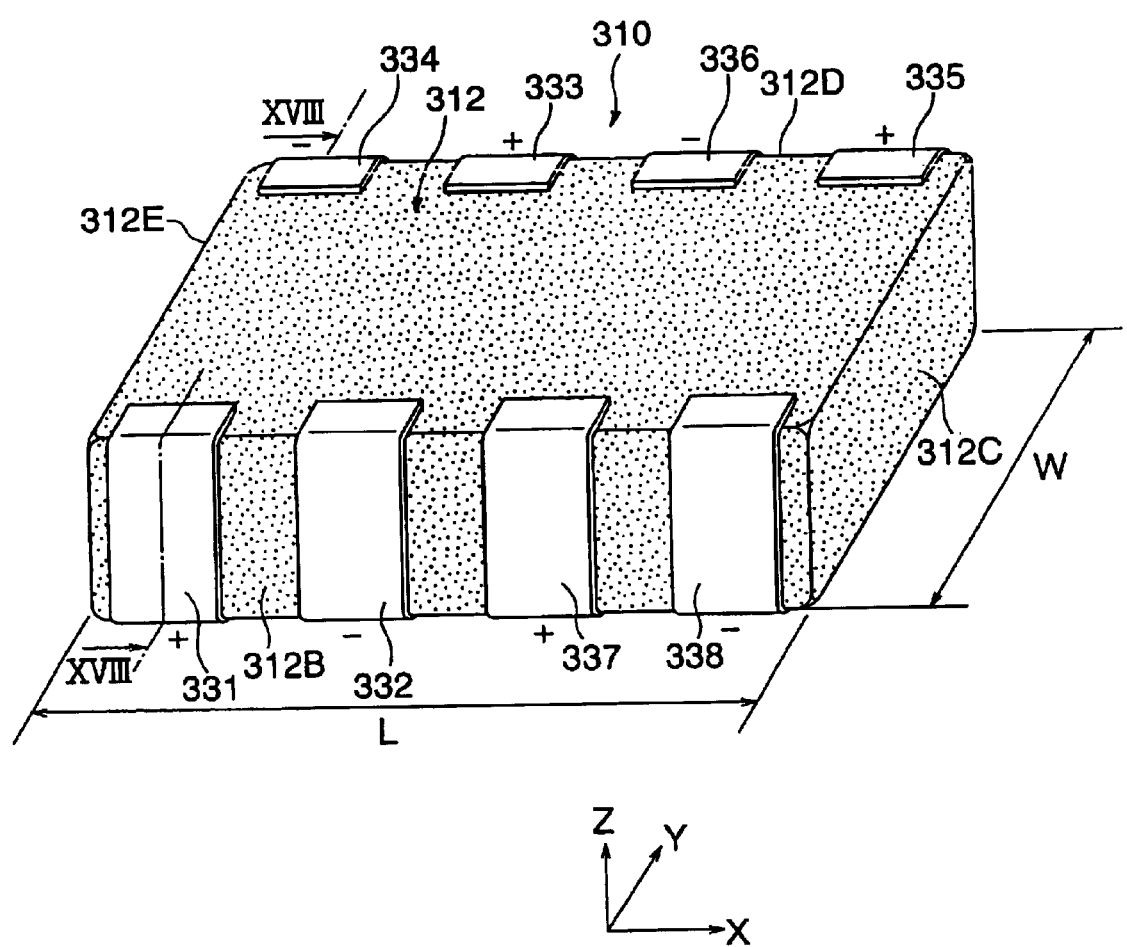
FIG. 17 is a perspective view of the multilayer capacitor shown in FIG. 16.

The first internal conductor layer 321 has a first lead part 321A led to the first side surface 312B of the dielectric body 312 shown in FIG. 17. The fifth internal conductor layer 325 has a fifth lead part 325B led to the third side surface 312D on the opposite side of the first side surface 312B of the dielectric body 312.

The second internal conductor layer 322 has a second lead part 322A led to the first side surface 312B of the dielectric body 312. The sixth internal conductor layer 326 has a sixth lead part 326B led to a different position from the fifth lead part of the dielectric body 312 on the third side surface 312D.

The third internal conductor layer 323 has a third lead part 323A led to a different position from the fifth lead part 325A and the sixth lead part 326A on the third side surface 312D of the dielectric body 312. The seventh internal conductor layer 327 has a seventh lead part 327A led to a different position from the first lead part 321A and the second lead part 322A on the first side surface 312B of the dielectric body 312.

The fourth internal conductor layer 324 has a fourth lead part 324A led to a different position from the third lead part 323A, the fifth lead part 325A and the sixth lead part 326A on the third side surface 312D of the dielectric body 312. The eighth internal conductor layer 328 has a eighth lead part 328A led to a different position from the first lead part 321A, the second lead part 322A and seventh lead part 327A on the first side surface 312B of the dielectric body 312.

The first side surface 312B of the dielectric body 312 is attached with a first terminal electrode 331 connected to the first lead part 321A, a second terminal electrode 332 connected to the second lead part 322A, a seventh terminal electrode 337 connected to the seventh lead part 327A, and an eighth terminal electrode 338 connected to the eighth lead part 328A.

The third side surface 312D of the dielectric body 312 is attached with a third terminal electrode 333 connected to the third lead part 323A, a fourth terminal electrode 334 connected to the fourth lead part 324A, a fifth terminal electrode 335 connected to the fifth lead part 325A, and an sixth terminal electrode 336 connected to the sixth lead part 326A.

Four of the terminal electrodes 331 to 338 are respectively formed only on two facing side surfaces 312B and 312D on the longitudinal sides of the dielectric body 312. Adjoining terminal electrodes are away from each other and insulated. The second side surface 312C and the fourth side surface 312E are not formed with any terminal electrodes.

Figure 20:
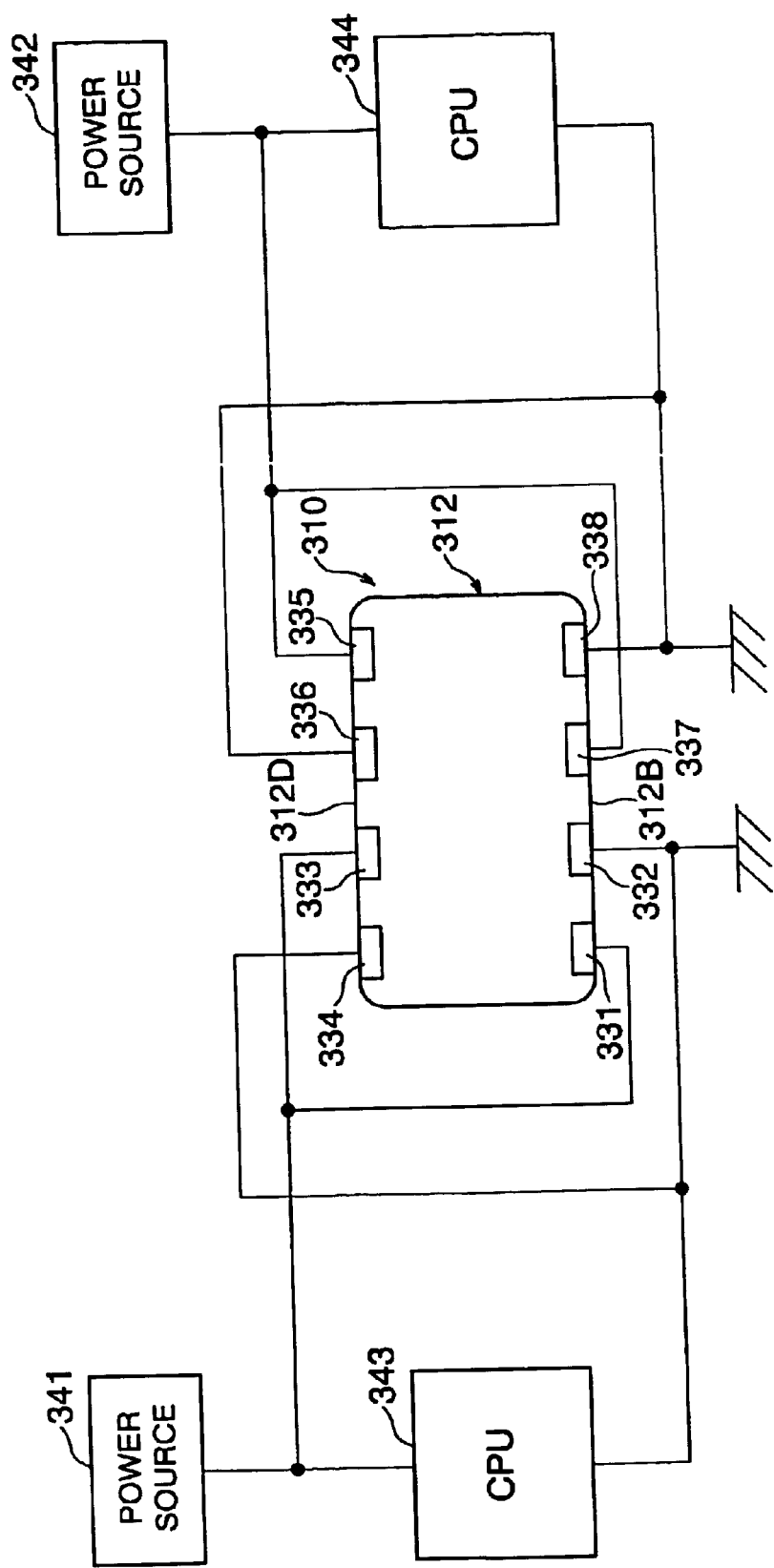
FIG. 20 is a circuit diagram wherein the multilayer capacitor shown in FIG. 16 to FIG. 18 is connected to two circuits as a capacitor array.
Figure 21:
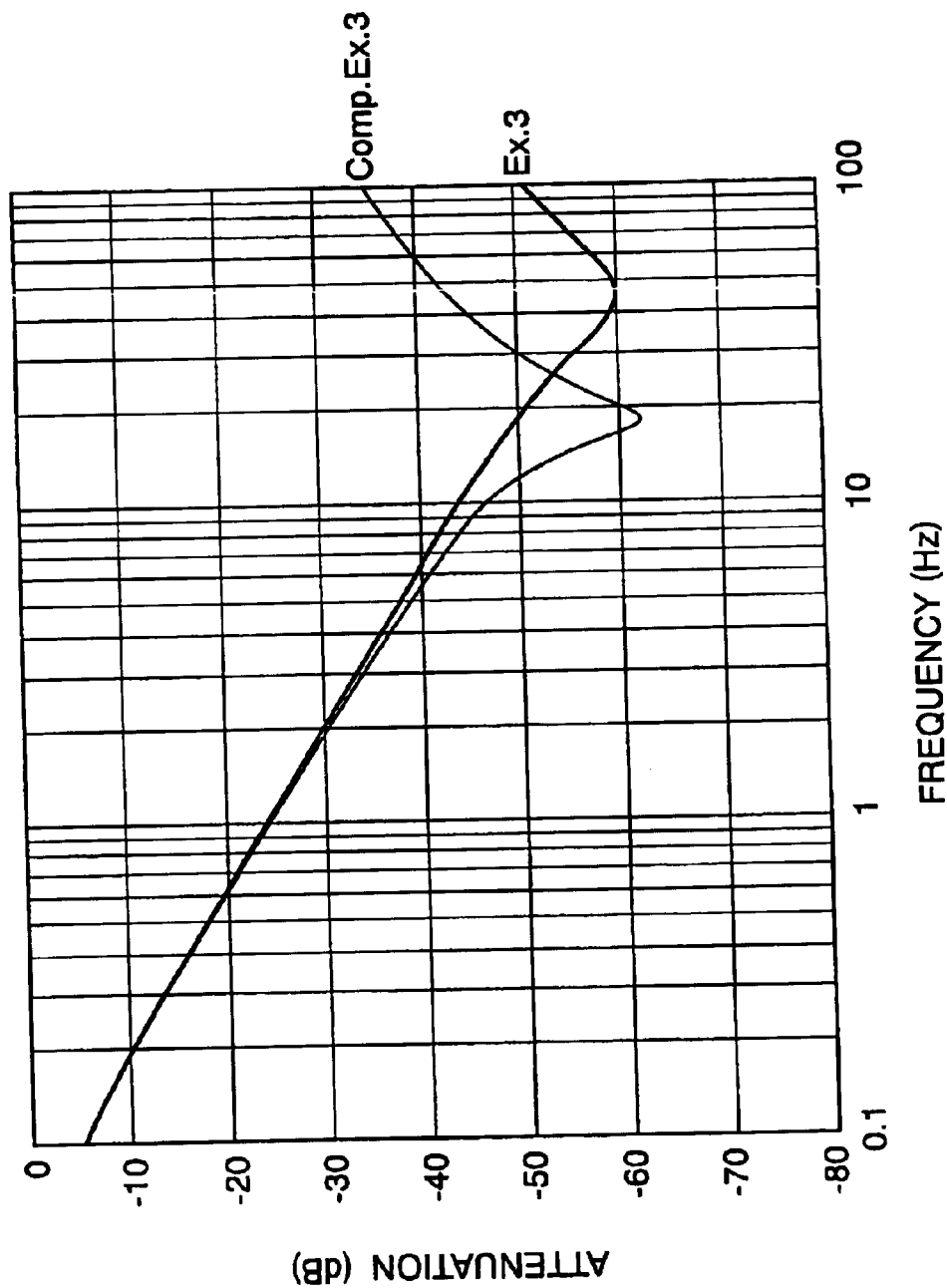
FIG. 21 is a view of a graph of the attenuation characteristics of samples according to examples and comparative examples of the present invention.

The multilayer capacitor 310 of the present embodiment is an element incorporating two capacitors, and, for example, a use example of a circuit diagram shown in FIG. 20 is considered. Specifically, terminal electrodes 331, 332, 333 and 334 on the left side in FIG. 20 are connected to the power source 341 and the CPU 343 on the left side. Namely, the terminal electrodes 331 and 333 are connected between one end side of the CPU 343 and the power source 341, and the terminal electrodes 332 and 334 are connected to the other side of the CPU 343 and also grounded.

Furthermore, the terminal electrodes 335, 336, 337 and 338 on the right side in FIG. 20 are connected to the power source 342 and the CPU 344 on the right side. Namely, the terminal electrodes 335 and 337 are connected between one end side of the CPU 344 and the power source 342, and the terminal electrodes 336 and 338 are connected to the other end side of the CPU 344 and also grounded.

Figure 19:
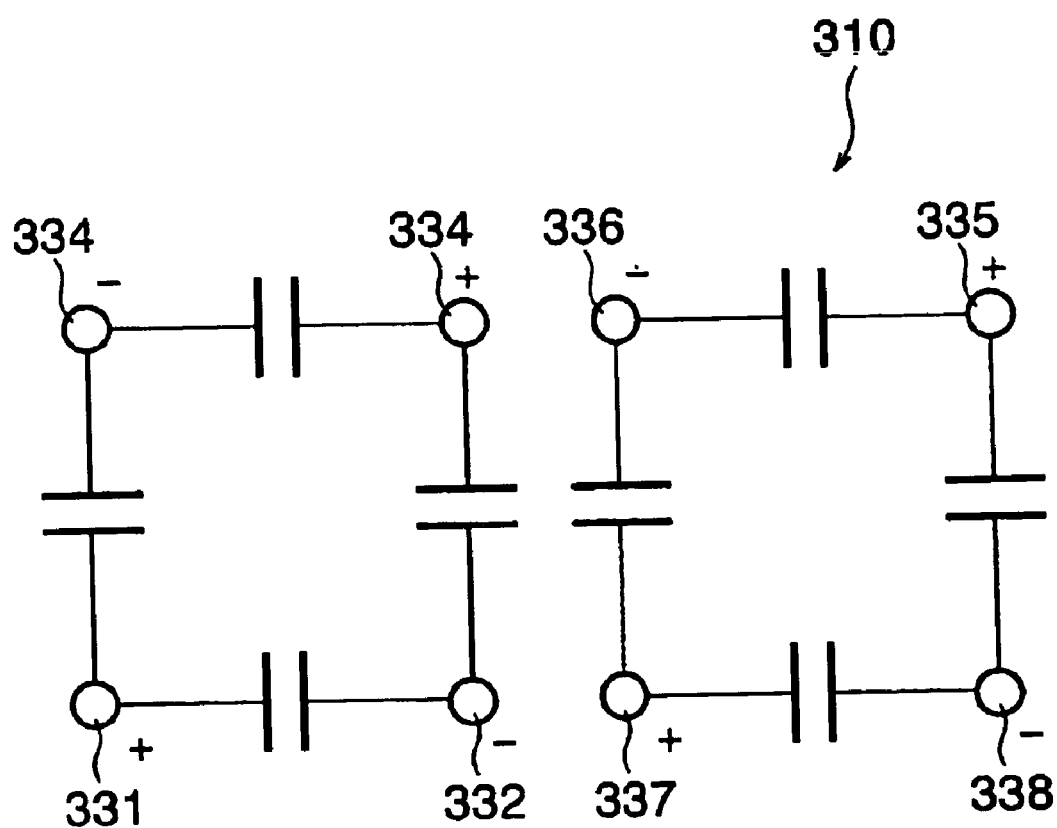
FIG. 19 is a view of an equivalent circuit of the multilayer capacitor shown in FIG. 16 to FIG. 18.

Therefore, as shown in the equivalent circuit shown in FIG. 19, the terminal electrodes 331, 333, 335 and 337 are used in a reverse polarity from that of the terminal electrodes 332, 334, 336 and 338. For example, as shown in FIG. 17 and FIG. 19, every other terminal electrodes 331 and 337 on the side surface 312B on the nearer side become positive electrodes, and every other terminal electrodes 332 and 338 become negative electrodes. Also, every other electrodes 333 and 335 on the side surface 312D on the far side become positive electrodes, and every other terminal electrodes 334 and 336 become negative electrodes. At this time, currents flow in the directions indicated by arrows in FIG. 16.

Namely, currents flow clockwise in the channel parts 321B, 323B, 325B and 327B of the internal conductor layers 321, 323, 325 and 327 respectively connected to the terminal electrodes 331, 333, 335 and 337. Also, currents flow anticlockwise in the channel parts 322B, 324B, 326B and 328B of the internal conductor layers 322, 324, 326 and 328 respectively connected to the terminal electrodes 332, 334, 336 and 338.

From the above, in the left side portion of the dielectric body 312, currents flow in mutually reverse directions between the channel part 321B and the channel part 322B of the internal conductor layers 321 and 322 adjoining across a ceramic layer 312A. In the same way, currents flow in mutually reverse directions between the channel part 322B and the channel part 323B of the internal conductor layers 322 and 323 adjoining across a ceramic layer 312A.

In the same way, currents flow in mutually reverse directions between the channel part 323B and the channel part 324B of the internal conductor layers 323 and 324 adjoining across a ceramic layer 312A, and between the channel part 324B and the channel part 321B of the internal conductor layers 324 and 321.

Also, in the internal conductor layers 325 to 328 in the right side portion of the dielectric body 312, currents flow in mutually reverse directions in the internal conductor layers adjoining across a ceramic layer 312A.

Next, an operation of the multilayer capacitor 310 according to the present embodiment will be explained.

According to the multilayer capacitor 310 according to the present embodiment, two types of terminal electrodes are respectively arranged on the same plane from the eight types of internal conductor layers 321 to 328 connected respectively to the eight terminal electrodes 331 to 338. Also, in the present embodiment, two sets of capacitors arranged in parallel are formed as a result that the internal conductor layers face to each other.

As a result, when powering up the multilayer capacitor 310 according to the present embodiment, in the terminal electrodes 331 to 338, polarities become different from each other to be alternately positive and negative electrodes between adjoining terminal electrodes on the same side surface as currents flow. Along with this, magnetic fluxes generated respectively in the lead parts 321A to 328A are cancelled out by the currents flowing in reverse directions between adjoining lead parts, and the effect of reducing the equivalent serial inductance is obtained.

Also, when powering up the multilayer capacitor 310, between the channel parts 321B to 324B of the internal conductor layers 321 to 324 adjoining across ceramic layers 312A, and between the channel parts 325B to 328B of the internal conductor layers 325 to 328, currents flow in mutually reverse directions. Along with this, magnetic fluxes generated by high frequency currents flowing in the internal conductor layers are cancelled out by each other. By reducing the parasitic inductance of the multilayer capacitor 310 itself, the equivalent serial inductance (ESL) is furthermore reduced.

Further, even in the same internal conductor layers 321 to 328, current flowing directions become reverse respectively between the parts positioned across the cut parts 329A to 329D of the channel parts 321B to 328B. Thus, the equivalent serial inductance is furthermore reduced.

From the above, in the multilayer capacitor 310 according to the present embodiment, the ESL is widely reduced and the effective inductance is widely reduced. As a result, according to the present embodiment, fluctuations of a power source voltage can be surely suppressed and a multilayer capacitor 310 most suitable to the CPU power source is obtained.

Furthermore, in the present embodiment, two or more of the eight types of internal conductor layers 321 to 328 are arranged on the same plane, respectively, to configure a capacitor array comprising two sets of capacitors. Therefore, a multilayer capacitor 310 having higher performance can be realized. Since four terminal electrodes connected to the lead parts of the internal conductor layers are provided on two side surfaces 312B and 312D formed to be long among the four side surfaces 312B to 312E of the dielectric body 312, the two long side surfaces 312B and 312D can be effectively utilized. Therefore, the multilayer capacitor 310 can be also made compact.

Furthermore, in the present embodiment, since the eight internal conductor layers 321 to 328 are arranged by the number of two or more each in the dielectric body 312, so not only does the electrostatic capacity of the multilayer capacitor 310 become higher, but also the action of cancellation of the magnetic fields becomes further greater, the inductance is more greatly reduced, and the ESL is more greatly reduced.

Next, by using a network analyzer, the Sz1 characteristic of an S parameter of each sample below was measured and the attenuation characteristics of each sample were obtained. First, each sample will be explained. Namely, the multilayer capacitor shown in FIG. 9 as a general capacitor is a comparative example 3, and the multilayer capacitor according to the embodiment shown in FIG. 17 is an example 3.

Here, the constants of the equivalent circuit were calculated so that the measured value of the attenuation characteristic matches with the amount of attenuation of the equivalent circuit in the multilayer capacitor 100 shown in FIG. 7. Further, from the data of the attenuation characteristics of the samples shown in FIG. 21, it is learned that a resonance point of the example 3 becomes high as 43 MHz or so from 18 MHz or so of the comparative example 3, and an attenuation amount of the example 3 at a frequency of 40 MHz or more is increased by about 15 dB compared with that of the comparative example 3. Therefore, from the data, it can be understood that improvement of the high frequency characteristics is seen in the example.

Note that the result of the ESL obtained by measuring with an impedance analyzer and calculating was widely reduced to 135.2 pH in the example 3 compared with 750.5 pH of the comparative example 3. Note that the equivalent serial resistance (ESR) was 20.5 mΩ in the comparative example 3 and 24.8 mΩ in the example 3.

Here, relating to the dimensions of the samples used, as shown in FIG. 17 and FIG. 9, the length W and the length L were, in both of the comparative example 3 and example 3 of the invention, W=1.25 mm and L=2.0 mm. Further, the electrostatic capacities of the samples used for the tests were 0.105 µF for the comparative example 3 and 0.102 µF for the example 3.

Note that the multilayer capacitor 310 according to the present embodiment is configured to have eight types of internal conductor layers, but the number of the layers is not limited to the number explained in the embodiment and may be a larger number. Also, in the above embodiment, adjoining terminal electrodes had mutually reverse polarities, and along with this, the internal conductor layers are arranged so that mutually facing terminal electrodes have reverse polarities in the above embodiment.

Note that the present invention is not limited to the above embodiments and may be variously modified within the scope of the present invention.

What is claimed is:

1. A multilayer capacitor comprising:
   dielectric layers and
   at least eight types of, that is, first to eight, internal conductor layers insulated from one another by said dielectric layer and arranged in an order from the first to eighth ones in a dielectric body;
   wherein
   each of said first to eighth internal conductor layers is formed with only one straight line shaped cut part;
   each of said internal conductor layers is formed with a channel part for a current to flow in return by said cut part; and
   the channel parts in said internal conductor layers adjoining each other across said dielectric layer in the stacking direction carry current flowing in the reverse directions from each other,
   plane shapes of the first internal conductor layer and the fifth internal conductor layer being symmetric to each other with respect to a center of each other;
   plane shapes of the second internal conductor layer and the sixth internal conductor layer being symmetric to each other with respect to a center of each other;
   plane shapes of the third internal conductor layer and the seventh internal conductor layer being symmetric to each other with respect to a center of each other;
   plane shapes of the fourth internal conductor layer and the eighth internal conductor layer being symmetric to each other with respect to a center of each other,
   the first internal conductor layer has a first lead part led to the first side surface of the dielectric body;
   the second internal conductor layer has a second lead part led to a different position from the first lead part on the first side surface of the dielectric body;
   the third internal conductor layer has a third lead part led to the second side surface being different from the first side surface and the third side surface of the dielectric body;
   the fourth internal conductor layer has a fourth lead part led to a different position from the third lead part on the second side surface of the dielectric body;
   the fifth internal conductor layer has a fifth lead part led to the third side surface on the opposite side of the first side surface of the dielectric body;
   the sixth internal conductor layer has a sixth lead part led to a different position from the fifth lead part on the third side surface of the dielectric body;
   the seventh internal conductor layer has a seventh lead part led to the fourth side surface on the opposite side of the second side surface of the dielectric body; and
   the eighth internal conductor layer has an eighth lead part led to a different position from the seventh lead part on the fourth side surface of the dielectric body.

2. The multilayer capacitor as set forth in claim 1, wherein a width of each of said lead parts is 1/3 to 1/4 of a width of said channel part in each of said internal conductor layers.

3. The multilayer capacitor as set forth in claim 1, wherein
   a first terminal electrode and a second terminal electrode respectively connected to said first lead part and second lead part are attached to the first side surface of said dielectric body;
   a third terminal electrode and a fourth terminal electrode respectively connected to said third lead part and fourth lead part are attached to the second side surface of said dielectric body;
   a fifth terminal electrode and a sixth terminal electrode respectively connected to said fifth lead part and sixth lead part are attached to the third side surface of said dielectric body; and
   a seventh terminal electrode and an eighth terminal electrode respectively connected to said seventh lead part and eighth lead part are attached to the fourth side surface of said dielectric body.

4. The multilayer capacitor as set forth in claim 1, wherein said first to eighth internal conductor layers are stacked in this order repeatedly for a plurality of times in the stacking direction respectively across said dielectric layers.

5. The multilayer capacitor as set forth in claim 1, wherein a width of said cut part is 1/10 to 1/3 of a width of said internal conductor layer.

* * * * *